US011813698B2

(12) United States Patent
Hara et al.

(10) Patent No.: US 11,813,698 B2
(45) Date of Patent: Nov. 14, 2023

(54) LASER CUTTING METHOD AND MACHINE, AND AUTOMATIC PROGRAMING APPARATUS

(71) Applicant: AMADA CO., LTD., Kanagawa (JP)

(72) Inventors: Hideo Hara, Kanagawa (JP); Masato Kunihiro, Kanagawa (JP)

(73) Assignee: Amada Co., Ltd., Kanagawa (JP)

( * ) Notice: Subject to any disclaimer, the term of this patent is extended or adjusted under 35 U.S.C. 154(b) by 318 days.

(21) Appl. No.: 17/276,688

(22) PCT Filed: Sep. 6, 2019

(86) PCT No.: PCT/JP2019/035139
§ 371 (c)(1),
(2) Date: Mar. 16, 2021

(87) PCT Pub. No.: WO2020/059533
PCT Pub. Date: Mar. 26, 2020

(65) Prior Publication Data
US 2021/0268608 A1 Sep. 2, 2021

(30) Foreign Application Priority Data
Sep. 21, 2018 (JP) .................................. 2018-177354

(51) Int. Cl.
*B23K 26/382* (2014.01)
*B23K 26/21* (2014.01)
(Continued)

(52) U.S. Cl.
CPC ........ *B23K 26/382* (2015.10); *B23K 26/0884* (2013.01); *B23K 26/21* (2015.10); *B23K 2103/05* (2018.08); *B23K 2103/10* (2018.08)

(58) Field of Classification Search
CPC ............ B23K 2101/18; B23K 2103/04; B23K 2103/05; B23K 2103/10; B23K 26/0876;
(Continued)

(56) References Cited

U.S. PATENT DOCUMENTS

| | | | |
|---|---|---|---|
| 10,974,346 B2 * | 4/2021 | Jin | ........................ B23K 26/08 |
| 2020/0001401 A1 | 1/2020 | Jin | |

FOREIGN PATENT DOCUMENTS

| | | |
|---|---|---|
| EP | 3088095 A1 | 11/2016 |
| JP | H05-245671 A | 9/1993 |

(Continued)

OTHER PUBLICATIONS

Extended European Search Report for corresponding EP Application No. 19863915.5 dated Nov. 11, 2021.
(Continued)

*Primary Examiner* — Dana Ross
*Assistant Examiner* — Joseph W Iskra
(74) *Attorney, Agent, or Firm* — Renner, Otto, Boisselle & Sklar, LLP

(57) ABSTRACT

In a laser cutting method, a cut slit of a welding protruding-tab configured to be bent by laser cutting along an outline of a processed part and press a peripheral surface of the processed part is laser-cut in advance in a periphery of the processed part that is cut from a workpiece, and an outline slit is formed by performing laser cutting along the outline of the processed part and a free end of the welding protruding-tab is welded to the peripheral surface of the processed part. According to the above described laser cutting method, it is possible to retain the processed part reliably and stably for a long period, and it is possible to easily separate the processed part from the workpiece with almost no trace left on the processed part.

31 Claims, 30 Drawing Sheets

(51) Int. Cl.
*B23K 26/08* (2014.01)
*B23K 103/10* (2006.01)
*B23K 103/04* (2006.01)

(58) Field of Classification Search
CPC .... B23K 26/0884; B23K 26/21; B23K 26/22; B23K 26/38; B23K 26/382; B23K 26/70; B23K 37/00
USPC .................................................. 219/121.71
See application file for complete search history.

(56) References Cited

FOREIGN PATENT DOCUMENTS

| | | | |
|---|---|---|---|
| JP | H06-238475 A | | 8/1994 |
| JP | H06238475 | * | 8/1994 |
| JP | 10-85975 A | | 4/1998 |
| JP | 2013116493 | * | 6/2013 |
| JP | 2015-85330 A | | 5/2015 |
| WO | 2018/174020 A1 | | 9/2018 |

OTHER PUBLICATIONS

International Search Report for corresponding Application No. PCT/JP2019/035139, dated Nov. 26, 2019.
Written Opinion for corresponding Application No. PCT/JP2019/035139, dated Nov. 26, 2019.

* cited by examiner

Fig. 7
(a)
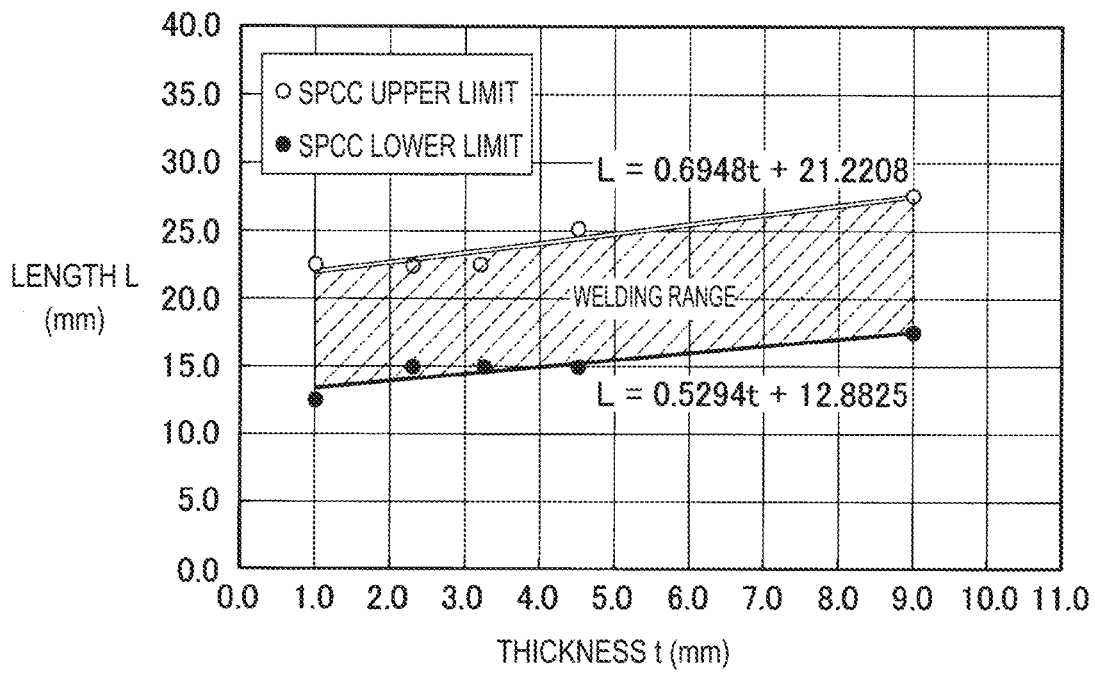
(b)
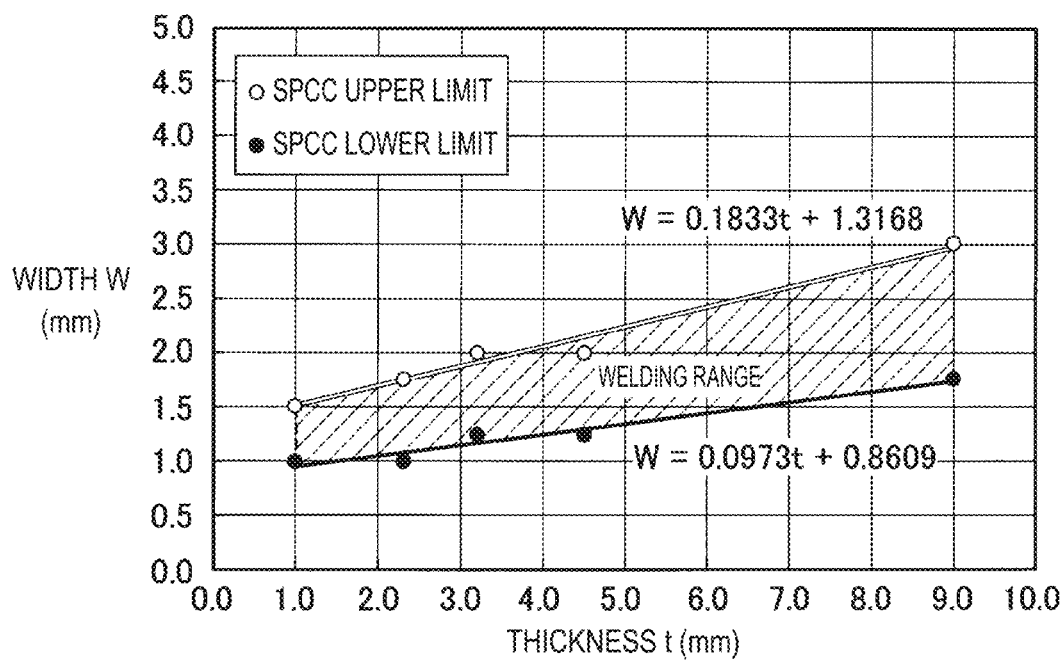

Fig. 9
(a)
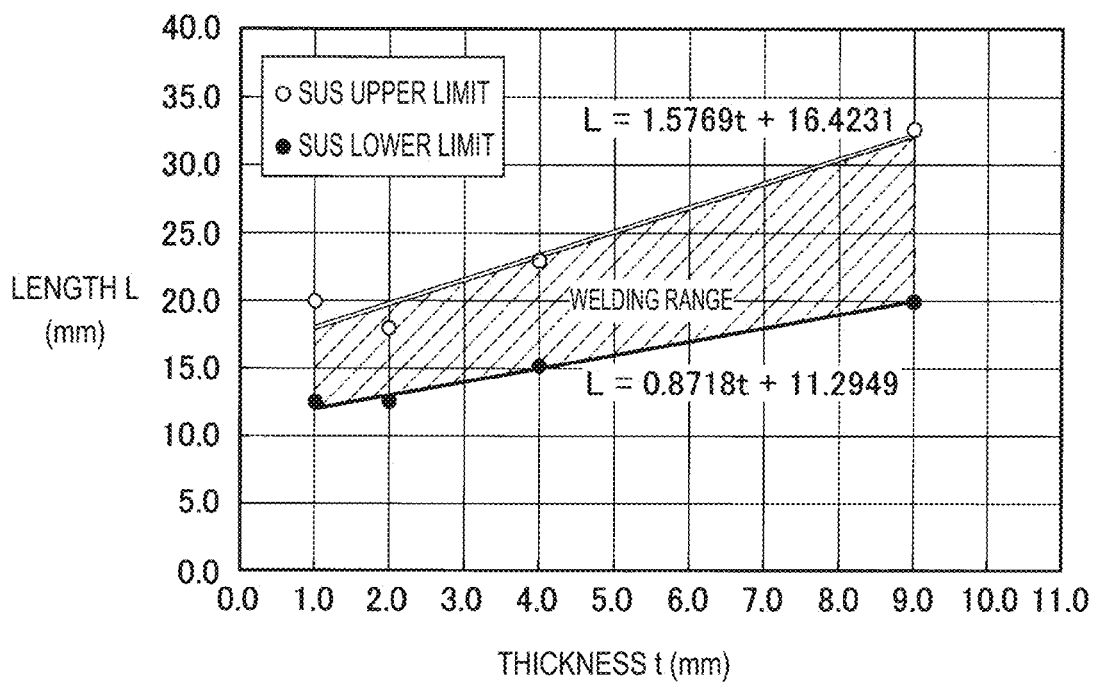
(b)
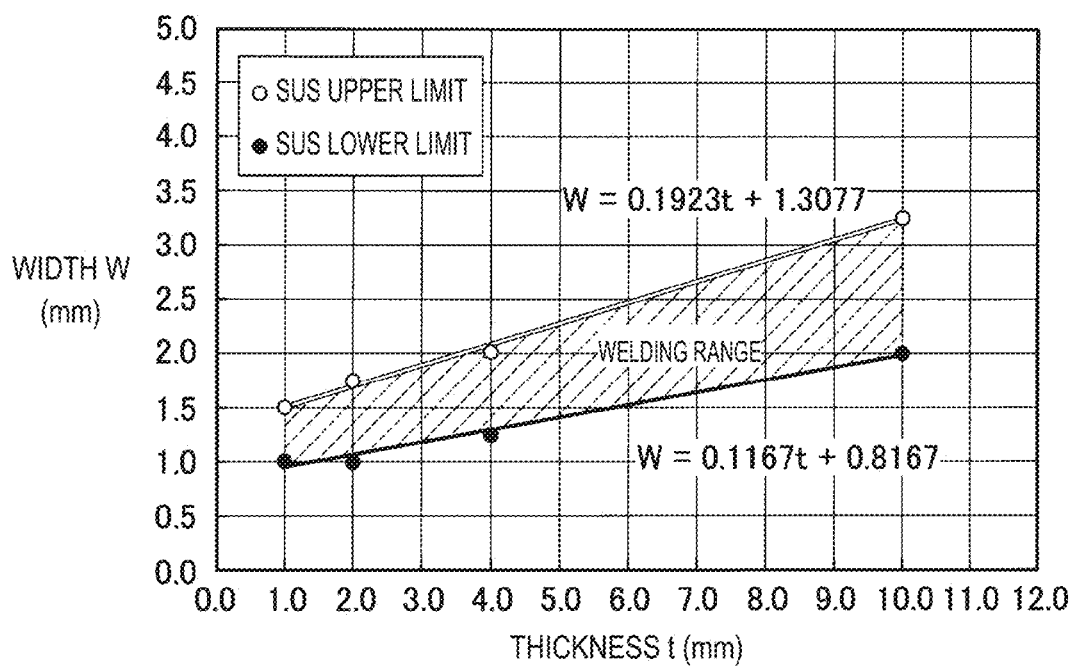

Fig. 11
(a)
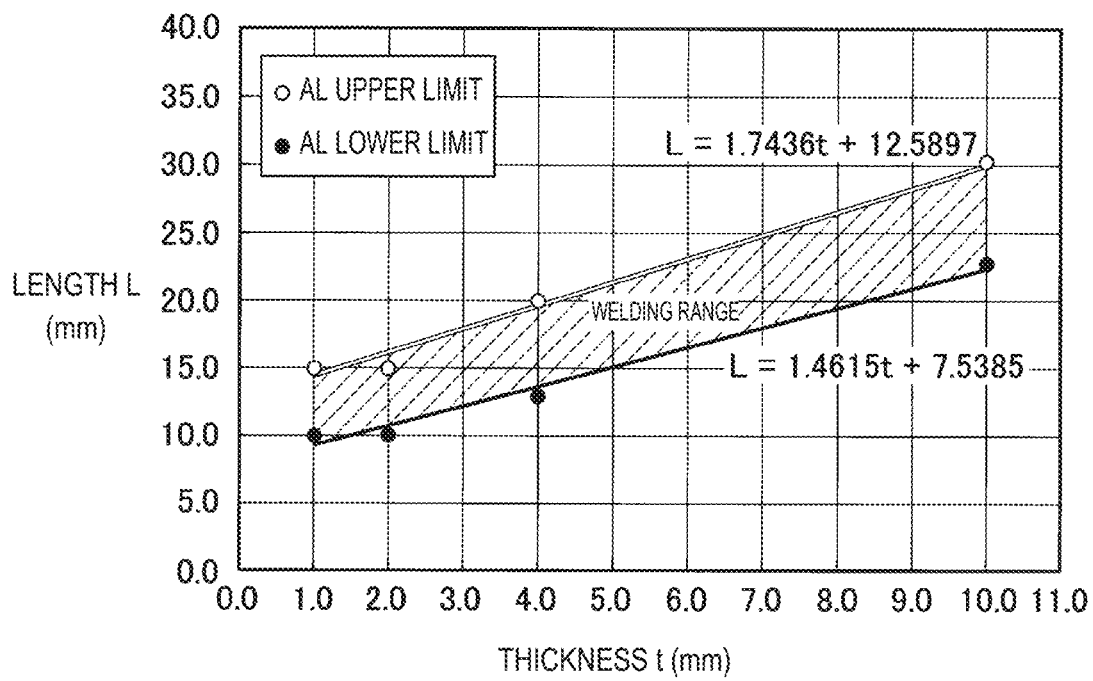
(b)
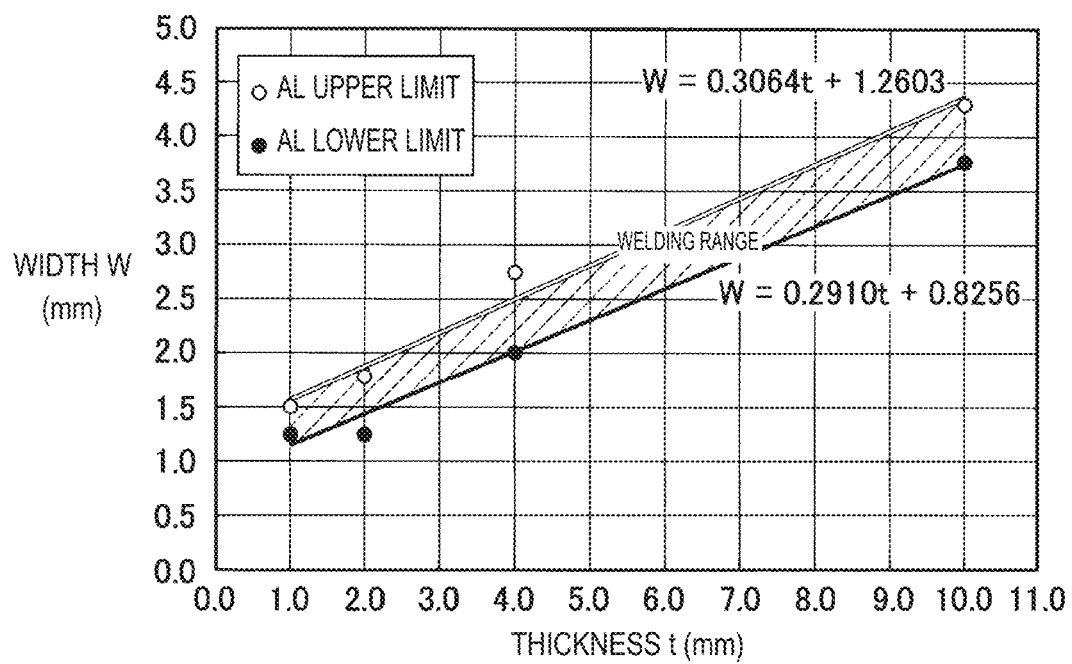

Fig. 17
(a)
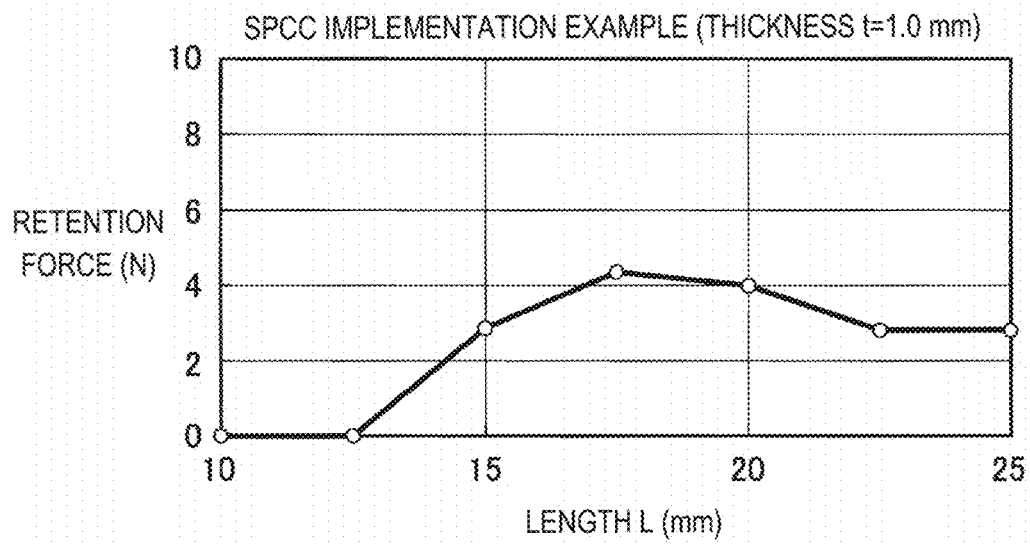
(b)
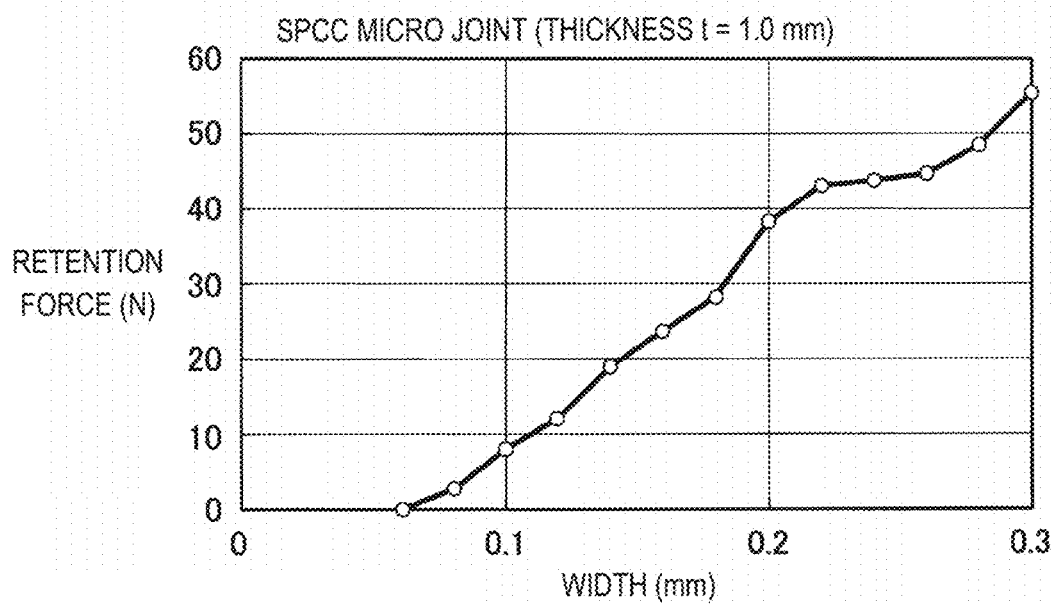

Fig. 18
(a)
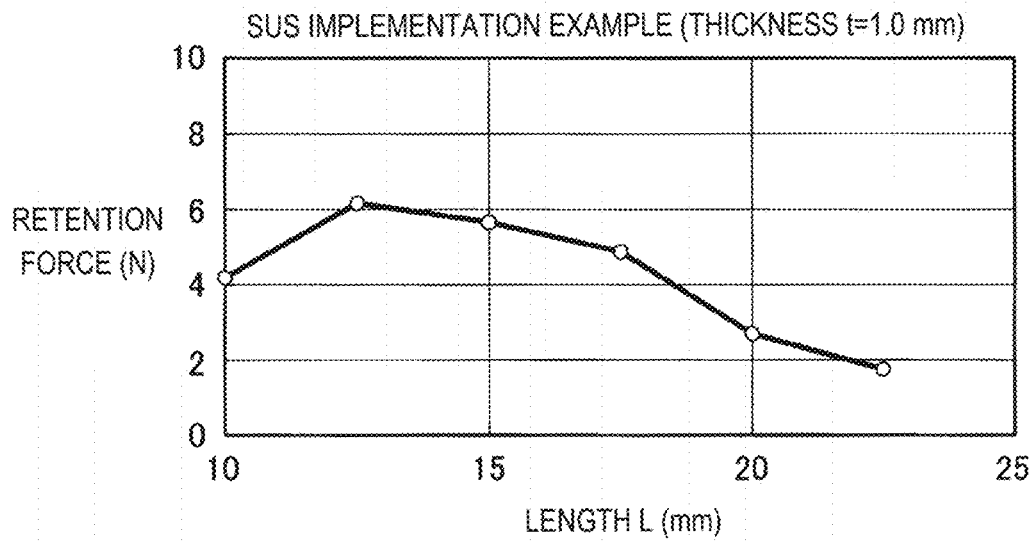
(b)
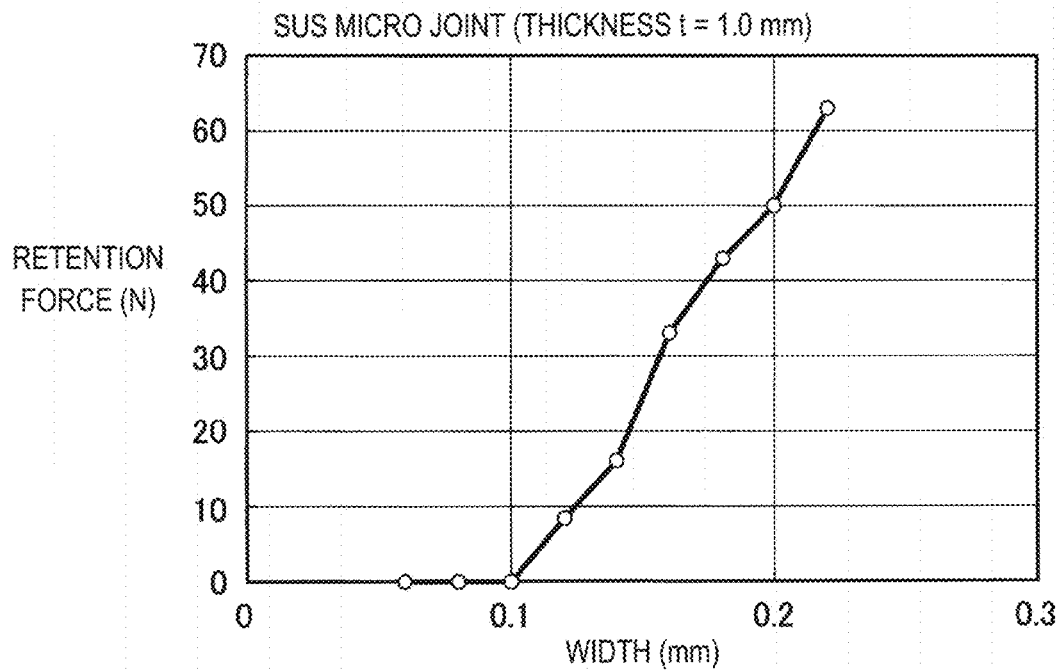

Fig. 19
(a)
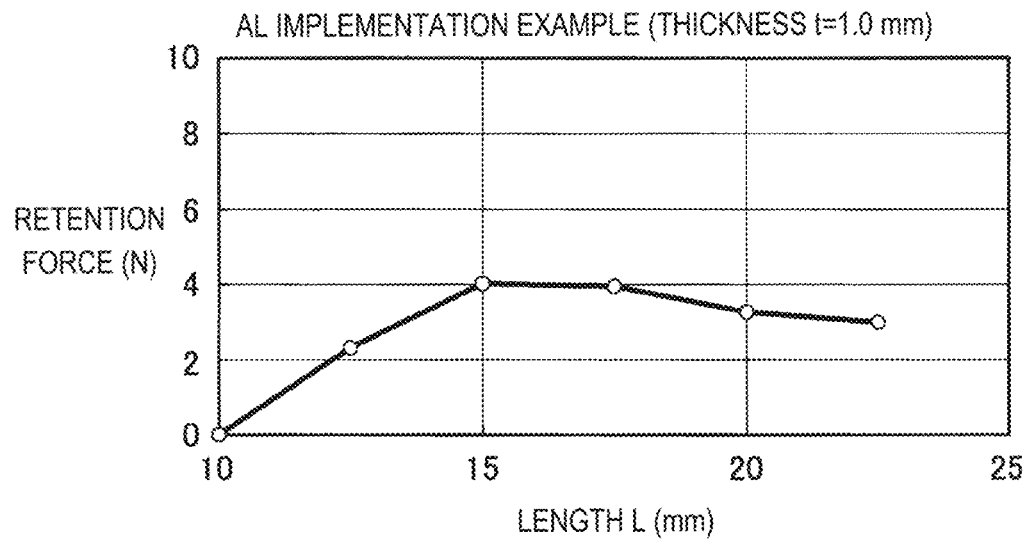
(b)
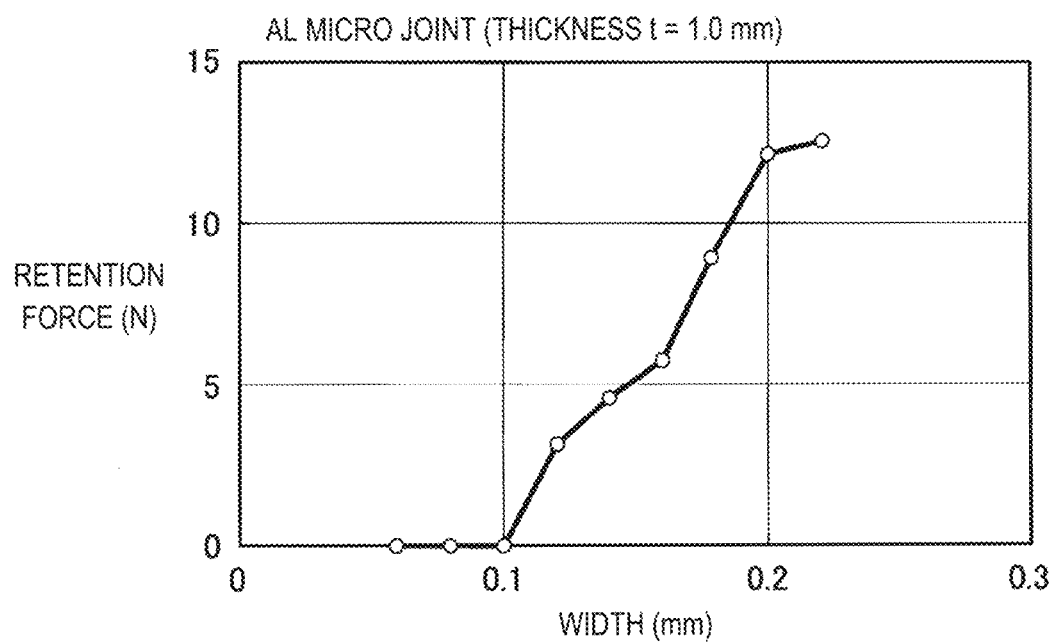

Fig. 24

[Table 1]

Retention force (unit: N) SPCC thickness t=1.0 mm

| Length L (mm) \ Width W (mm) | 0.50 | 0.75 | 1.00 | 1.25 | 1.50 | 1.75 | 2.00 | 2.25 | 2.50 |
|---|---|---|---|---|---|---|---|---|---|
| 7.5 | 0.0 | 0.0 | 0.0 | 0.0 | 0.0 | 0.0 | 0.0 | 0.0 | 0.0 |
| 10.0 | 0.0 | 1.1 | 1.4 | 2.2 | 1.2 | 0.0 | 0.0 | 0.0 | 0.0 |
| 12.5 | 0.0 | 2.0 | 2.2 | 2.4 | 2.2 | 1.6 | 0.0 | 0.0 | 0.0 |
| 15.0 | 0.0 | 1.9 | 2.3 | 2.9 | 2.7 | 1.5 | 0.0 | 0.0 | 0.0 |
| 17.5 | 0.0 | 2.6 | 3.6 | 4.6 | 3.8 | 1.5 | 1.1 | 0.0 | 0.0 |
| 20.0 | 0.0 | 1.9 | 3.4 | 4.2 | 3.9 | 1.5 | 1.3 | 1.0 | 0.0 |
| 22.5 | 0.0 | 1.6 | 3.0 | 3.9 | 2.9 | 1.6 | 0.0 | 0.0 | 0.0 |
| 25.0 | 0.0 | 0.0 | 1.6 | 1.9 | 0.0 | 0.0 | 0.0 | 0.0 | 0.0 |
| 27.5 | 0.0 | 0.0 | 0.0 | 0.0 | 0.0 | 0.0 | 0.0 | 0.0 | 0.0 |

Fig. 25

[Table 2]

Retention force (unit: N) SPCC thickness t=3.2 mm

| Length L (mm) \ Width W (mm) | 0.50 | 0.75 | 1.00 | 1.25 | 1.50 | 1.75 | 2.00 | 2.25 | 2.50 |
|---|---|---|---|---|---|---|---|---|---|
| 10.0 | 0.0 | 0.0 | 0.0 | 0.0 | 0.0 | 6.4 | 0.0 | 0.0 | 0.0 |
| 12.5 | 0.0 | 6.5 | 8.0 | 9.5 | 10.7 | 10.6 | 6.8 | 0.0 | 0.0 |
| 15.0 | 0.0 | 7.1 | 8.5 | 10.1 | 11.1 | 13.1 | 10.0 | 8.2 | 0.0 |
| 17.5 | 0.0 | 7.5 | 8.9 | 14.0 | 14.4 | 14.7 | 13.1 | 9.5 | 7.1 |
| 20.0 | 0.0 | 5.4 | 7.4 | 12.3 | 13.3 | 14.1 | 12.1 | 8.9 | 5.9 |
| 22.5 | 0.0 | 0.0 | 6.2 | 9.6 | 9.9 | 11.1 | 11.8 | 7.7 | 4.9 |
| 25.0 | 0.0 | 0.0 | 5.2 | 7.3 | 7.5 | 8.0 | 9.9 | 5.0 | 3.8 |
| 27.5 | 0.0 | 0.0 | 4.2 | 5.2 | 6.2 | 6.5 | 5.5 | 4.1 | 1.4 |
| 30.0 | 0.0 | 0.0 | 0.0 | 0.0 | 0.0 | 0.0 | 0.0 | 0.0 | 0.0 |

Fig. 26

[Table 3]

Retention force (unit: N) SPCC thickness t=9.0 mm

| Length L (mm) \ Width W (mm) | 1.00 | 1.25 | 1.50 | 1.75 | 2.00 | 2.25 | 2.50 | 2.75 | 3.00 | 3.25 | 3.50 | 3.75 | 4.00 |
|---|---|---|---|---|---|---|---|---|---|---|---|---|---|
| 12.5 | 0.0 | 0.0 | 0.0 | 0.0 | 0.0 | 0.0 | 0.0 | 0.0 | 0.0 | 0.0 | 0.0 | 0.0 | 0.0 |
| 15.0 | 0.0 | 0.0 | 0.0 | 17.4 | 26.4 | 41.4 | 27.8 | 12.3 | 0.0 | 0.0 | 0.0 | 0.0 | 0.0 |
| 17.5 | 10.9 | 24.1 | 34.1 | 43.3 | 46.4 | 47.5 | 32.2 | 24.4 | 18.8 | 11.1 | 0.0 | 0.0 | 0.0 |
| 20.0 | 0.0 | 9.2 | 27.6 | 47.5 | 49.8 | 51.5 | 43.3 | 37.8 | 26.4 | 18.4 | 10.7 | 0.0 | 0.0 |
| 22.5 | 0.0 | 0.0 | 25.1 | 45.4 | 60.1 | 64.4 | 59.0 | 51.5 | 31.5 | 19.5 | 16.5 | 6.9 | 0.0 |
| 25.0 | 0.0 | 0.0 | 16.3 | 37.0 | 46.4 | 56.3 | 60.9 | 46.0 | 30.7 | 18.4 | 6.9 | 0.0 | 0.0 |
| 27.5 | 0.0 | 0.0 | 0.0 | 24.1 | 27.6 | 42.5 | 47.5 | 37.2 | 26.0 | 12.3 | 5.7 | 0.0 | 0.0 |
| 30.0 | 0.0 | 0.0 | 0.0 | 11.9 | 27.2 | 35.2 | 31.8 | 24.1 | 15.3 | 4.2 | 0.0 | 0.0 | 0.0 |
| 32.5 | 0.0 | 0.0 | 0.0 | 0.0 | 23.0 | 36.2 | 23.6 | 19.5 | 0.0 | 0.0 | 0.0 | 0.0 | 0.0 |
| 35.0 | 0.0 | 0.0 | 0.0 | 0.0 | 0.0 | 0.0 | 0.0 | 0.0 | 0.0 | 0.0 | 0.0 | 0.0 | 0.0 |

Fig. 27

[Table 4]

Retention force (unit: N) SUS thickness t=1.0 mm

| Length L (mm) \ Width W (mm) | 0.50 | 0.75 | 1.00 | 1.25 | 1.50 | 1.75 | 2.00 | 2.25 | 2.50 |
|---|---|---|---|---|---|---|---|---|---|
| 5.0 | 0.0 | 0.0 | 0.0 | 0.0 | 0.0 | 0.0 | 0.0 | 0.0 | 0.0 |
| 7.5 | 0.0 | 0.0 | 0.0 | 2.3 | 2.0 | 1.8 | 0.0 | 0.0 | 0.0 |
| 10.0 | 0.0 | 1.8 | 3.0 | 4.5 | 3.9 | 3.2 | 1.6 | 0.0 | 0.0 |
| 12.5 | 0.0 | 3.3 | 4.6 | 5.2 | 4.8 | 3.7 | 1.8 | 0.0 | 0.0 |
| 15.0 | 0.0 | 4.7 | 5.2 | 6.2 | 5.5 | 5.2 | 3.0 | 0.0 | 0.0 |
| 17.5 | 0.0 | 4.4 | 4.7 | 5.2 | 4.6 | 3.5 | 2.7 | 0.0 | 0.0 |
| 20.0 | 0.0 | 1.8 | 3.6 | 3.8 | 3.5 | 3.0 | 2.1 | 0.0 | 0.0 |
| 22.5 | 0.0 | 0.0 | 1.4 | 3.6 | 1.2 | 0.0 | 0.0 | 0.0 | 0.0 |
| 25.0 | 0.0 | 0.0 | 0.0 | 1.4 | 0.0 | 0.0 | 0.0 | 0.0 | 0.0 |

Fig. 28

[Table 5]

Retention force (unit: N) SUS thickness t=4.0 mm

| Length L (mm) \ Width W (mm) | 0.50 | 0.75 | 1.00 | 1.25 | 1.50 | 1.75 | 2.00 | 2.25 | 2.50 |
|---|---|---|---|---|---|---|---|---|---|
| 7.5 | 0.0 | 0.0 | 0.0 | 0.0 | 0.0 | 0.0 | 0.0 | 0.0 | 0.0 |
| 10.0 | 0.0 | 0.0 | 23.2 | 40.2 | 32.2 | 24.6 | 0.0 | 0.0 | 0.0 |
| 12.5 | 0.0 | 11.4 | 55.3 | 73.7 | 60.6 | 47.0 | 16.8 | 0.0 | 0.0 |
| 15.0 | 0.0 | 13.9 | 60.4 | 81.8 | 74.5 | 67.5 | 40.5 | 20.1 | 8.5 |
| 17.5 | 0.0 | 19.9 | 70.1 | 90.3 | 87.8 | 77.5 | 61.9 | 47.0 | 27.3 |
| 20.0 | 0.0 | 8.8 | 45.0 | 67.1 | 80.2 | 74.2 | 67.9 | 50.3 | 23.8 |
| 22.5 | 0.0 | 0.0 | 23.2 | 46.5 | 63.6 | 61.8 | 41.2 | 28.1 | 16.8 |
| 25.0 | 0.0 | 0.0 | 0.0 | 14.9 | 28.2 | 26.6 | 16.6 | 0.0 | 0.0 |
| 27.5 | 0.0 | 0.0 | 0.0 | 0.0 | 0.0 | 0.0 | 0.0 | 0.0 | 0.0 |

Fig. 29

[Table 6]

Retention force (unit: N) SUS thickness t=10.0 mm

| Length L (mm) \ Width W (mm) | 1.00 | 1.25 | 1.50 | 1.75 | 2.00 | 2.25 | 2.50 | 2.75 | 3.00 | 3.25 | 3.50 | 3.75 | 4.00 |
|---|---|---|---|---|---|---|---|---|---|---|---|---|---|
| 7.5 | 0.0 | 0.0 | 0.0 | 0.0 | 0.0 | 0.0 | 0.0 | 0.0 | 0.0 | 0.0 | 0.0 | 0.0 | 0.0 |
| 10.0 | 0.0 | 0.0 | 49.9 | 54.9 | 67.1 | 60.6 | 0.0 | 0.0 | 0.0 | 0.0 | 0.0 | 0.0 | 0.0 |
| 12.5 | 0.0 | 54.1 | 71.9 | 82.6 | 84.9 | 71.9 | 61.2 | 73.1 | 0.0 | 0.0 | 0.0 | 0.0 | 0.0 |
| 15.0 | 0.0 | 61.2 | 84.9 | 120.3 | 218.0 | 251.3 | 166.9 | 147.3 | 60.0 | 0.0 | 0.0 | 0.0 | 0.0 |
| 17.5 | 0.0 | 65.9 | 112.3 | 146.7 | 218.6 | 292.8 | 263.1 | 185.9 | 128.9 | 64.2 | 0.0 | 0.0 | 0.0 |
| 20.0 | 0.0 | 79.0 | 143.2 | 232.3 | 285.7 | 318.4 | 239.4 | 216.2 | 168.7 | 107.5 | 70.7 | 52.3 | 0.0 |
| 22.5 | 42.2 | 61.8 | 183.4 | 239.7 | 331.7 | 382.5 | 362.9 | 328.5 | 256.6 | 198.4 | 120.3 | 93.9 | 54.1 |
| 25.0 | 0.0 | 49.9 | 129.5 | 188.9 | 237.0 | 322.5 | 348.5 | 328.5 | 280.4 | 217.4 | 166.9 | 62.4 | 0.0 |
| 27.5 | 0.0 | 39.8 | 85.5 | 123.0 | 177.6 | 263.1 | 294.6 | 265.5 | 218.0 | 168.1 | 85.5 | 49.3 | 0.0 |
| 30.0 | 0.0 | 0.0 | 46.9 | 76.0 | 143.2 | 236.4 | 251.3 | 207.3 | 144.3 | 102.8 | 70.1 | 45.7 | 0.0 |
| 32.5 | 0.0 | 0.0 | 0.0 | 61.2 | 111.7 | 190.7 | 218.0 | 219.2 | 193.6 | 117.6 | 61.8 | 33.3 | 0.0 |
| 35.0 | 0.0 | 0.0 | 0.0 | 42.8 | 88.5 | 99.8 | 117.6 | 92.1 | 74.3 | 58.2 | 37.1 | 24.9 | 0.0 |
| 37.5 | 0.0 | 0.0 | 0.0 | 31.3 | 45.9 | 62.1 | 65.4 | 60.1 | 45.1 | 22.9 | 0.0 | 0.0 | 0.0 |

Fig. 30

[Table 7]

Retention force (unit: N) AL thickness t=1.0 mm

| Length L (mm) \ Width W (mm) | 0.50 | 0.75 | 1.00 | 1.25 | 1.50 | 1.75 | 2.00 | 2.25 | 2.50 |
|---|---|---|---|---|---|---|---|---|---|
| 5.0 | 0.0 | 0.0 | 0.0 | 0.0 | 0.0 | 0.0 | 0.0 | 0.0 | 0.0 |
| 7.5 | 0.0 | 0.0 | 0.0 | 0.0 | 0.0 | 0.0 | 0.0 | 0.0 | 0.0 |
| 10.0 | 0.0 | 1.6 | 2.3 | 3.3 | 3.1 | 2.4 | 1.2 | 0.0 | 0.0 |
| 12.5 | 0.0 | 2.6 | 3.1 | 3.9 | 4.1 | 3.9 | 3.5 | 3.0 | 2.0 |
| 15.0 | 0.0 | 1.2 | 1.8 | 3.3 | 3.4 | 3.2 | 2.9 | 2.4 | 0.0 |
| 17.5 | 0.0 | 0.0 | 1.5 | 2.0 | 2.3 | 2.5 | 2.0 | 0.9 | 0.0 |
| 20.0 | 0.0 | 0.0 | 0.0 | 0.0 | 0.0 | 0.0 | 0.0 | 0.0 | 0.0 |

Fig. 31

[Table 8]

Retention force (unit: N) AL thickness t=4.0 mm

| Length L (mm) \ Width W (mm) | 1.25 | 1.50 | 1.75 | 2.00 | 2.25 | 2.50 | 2.75 | 3.00 | 3.25 | 3.50 | 3.75 |
|---|---|---|---|---|---|---|---|---|---|---|---|
| 7.5 | 0.0 | 0.0 | 0.0 | 0.0 | 0.0 | 0.0 | 0.0 | 0.0 | 0.0 | 0.0 | 0.0 |
| 10.0 | 0.0 | 3.9 | 13.7 | 14.6 | 12.7 | 6.5 | 0.0 | 0.0 | 0.0 | 0.0 | 0.0 |
| 12.5 | 0.0 | 3.8 | 19.1 | 32.8 | 36.7 | 36.0 | 28.1 | 12.0 | 7.0 | 3.0 | 0.0 |
| 15.0 | 0.0 | 4.1 | 22.2 | 36.5 | 43.7 | 40.2 | 33.2 | 24.0 | 13.5 | 7.8 | 0.0 |
| 17.5 | 0.0 | 5.5 | 27.3 | 41.8 | 47.9 | 48.2 | 44.6 | 30.8 | 18.8 | 8.5 | 0.0 |
| 20.0 | 0.0 | 5.2 | 14.2 | 22.5 | 27.6 | 29.5 | 34.1 | 28.5 | 16.5 | 7.9 | 0.0 |
| 22.5 | 0.0 | 4.7 | 9.2 | 13.7 | 14.3 | 13.7 | 10.7 | 7.6 | 0.0 | 0.0 | 0.0 |
| 25.0 | 0.0 | 0.0 | 0.0 | 0.0 | 0.0 | 0.0 | 0.0 | 0.0 | 0.0 | 0.0 | 0.0 |

Fig. 32

[Table 9]

Retention force (unit: N)  AL thickness t=10.0 mm

| Length L (mm) \ Width W (mm) | 2.50 | 2.75 | 3.00 | 3.25 | 3.50 | 3.75 | 4.00 | 4.25 | 4.50 | 4.75 | 5.00 | 5.25 |
|---|---|---|---|---|---|---|---|---|---|---|---|---|
| 15.0 | 0.0 | 0.0 | 0.0 | 0.0 | 0.0 | 0.0 | 0.0 | 0.0 | 0.0 | 0.0 | 0.0 | 0.0 |
| 17.5 | 0.0 | 0.0 | 6.1 | 37.3 | 46.1 | 41.5 | 31.2 | 25.5 | 0.0 | 0.0 | 0.0 | 0.0 |
| 20.0 | 0.0 | 0.0 | 6.5 | 45.3 | 55.6 | 60.8 | 61.3 | 47.5 | 20.4 | 0.0 | 0.0 | 0.0 |
| 22.5 | 0.0 | 0.0 | 20.6 | 67.4 | 74.0 | 70.3 | 63.8 | 60.1 | 33.4 | 18.2 | 0.0 | 0.0 |
| 25.0 | 0.0 | 7.5 | 18.9 | 63.8 | 84.2 | 100.2 | 96.0 | 86.6 | 61.8 | 40.4 | 16.4 | 0.0 |
| 27.5 | 0.0 | 0.0 | 16.3 | 56.3 | 76.3 | 84.7 | 86.8 | 75.1 | 51.2 | 32.8 | 13.1 | 0.0 |
| 30.0 | 0.0 | 0.0 | 0.0 | 21.3 | 51.2 | 63.4 | 70.5 | 72.9 | 50.9 | 38.5 | 14.1 | 0.0 |
| 32.5 | 0.0 | 0.0 | 0.0 | 15.4 | 35.7 | 38.5 | 43.3 | 43.7 | 36.1 | 28.7 | 10.7 | 0.0 |
| 35.0 | 0.0 | 0.0 | 0.0 | 0.0 | 0.0 | 0.0 | 0.0 | 0.0 | 0.0 | 0.0 | 0.0 | 0.0 |

Fig. 33

[Table 10]
Retention force (unit: N) SPCC

| Thickness t (mm) \ Escape distance R (mm) | 0.000 | 0.025 | 0.050 | 0.075 | 0.100 | 0.125 | 0.150 | 0.175 | 0.200 | 0.225 | 0.250 | 0.275 | 0.300 | 0.325 | 0.350 | 0.375 | 0.400 | 0.425 |
|---|---|---|---|---|---|---|---|---|---|---|---|---|---|---|---|---|---|---|
| 1.0 | 2.4 | 2.8 | 3.6 | 4.6 | 5.3 | 6.2 | 4.3 | 3.4 | 2.9 | 1.3 | 0.0 | 0.0 | 0.0 | 0.0 | 0.0 | 0.0 | 0.0 | 0.0 |
| 2.3 | 4.1 | 5.6 | 9.1 | 10.4 | 10.6 | 11.3 | 8.9 | 5.0 | 2.9 | 1.7 | 1.2 | 0.9 | 0.0 | 0.0 | 0.0 | 0.0 | 0.0 | 0.0 |
| 3.2 | 4.1 | 9.4 | 12.5 | 14.7 | 19.4 | 20.1 | 20.7 | 19.0 | 7.1 | 4.5 | 3.2 | 0.0 | 0.0 | 0.0 | 0.0 | 0.0 | 0.0 | 0.0 |
| 4.5 | 12.2 | 15.2 | 15.8 | 17.0 | 19.0 | 20.6 | 22.8 | 31.4 | 32.8 | 31.4 | 27.5 | 11.8 | 6.6 | 0.0 | 0.0 | 0.0 | 0.0 | 0.0 |
| 9.0 | 38.6 | 42.8 | 40.1 | 57.0 | 61.3 | 64.4 | 70.2 | 84.2 | 91.4 | 97.3 | 99.1 | 95.7 | 89.4 | 84.3 | 65.7 | 44.1 | 19.7 | 0.0 |

Fig. 34

[Table 11]
Retention force (unit: N) SUS

| Thickness t (mm) \ Escape distance R (mm) | 0.000 | 0.025 | 0.050 | 0.075 | 0.100 | 0.125 | 0.150 | 0.175 | 0.200 | 0.225 | 0.250 | 0.275 | 0.300 | 0.325 | 0.350 | 0.375 | 0.400 | 0.425 | 0.450 | 0.475 |
|---|---|---|---|---|---|---|---|---|---|---|---|---|---|---|---|---|---|---|---|---|
| 1.0 | 3.6 | 4.8 | 5.7 | 6.2 | 6.8 | 7.2 | 7.0 | 6.6 | 4.7 | 3.4 | 2.1 | 1.5 | 0.0 | 0.0 | 0.0 | 0.0 | 0.0 | 0.0 | 0.0 | 0.0 |
| 2.0 | 18.9 | 24.3 | 31.4 | 34.8 | 37.4 | 40.8 | 42.9 | 39.7 | 34.4 | 28.8 | 17.2 | 8.9 | 0.0 | 0.0 | 0.0 | 0.0 | 0.0 | 0.0 | 0.0 | 0.0 |
| 4.0 | 38.3 | 43.2 | 72.4 | 84.8 | 90.3 | 97.4 | 108.8 | 113.4 | 117.1 | 104.1 | 97.3 | 84.8 | 66.2 | 40.9 | 22.1 | 0.0 | 0.0 | 0.0 | 0.0 | 0.0 |
| 10.0 | 111.0 | 128.1 | 137.3 | 181.0 | 207.6 | 284.3 | 327.7 | 382.5 | 402.4 | 417.3 | 430.7 | 442.0 | 448.3 | 453.4 | 430.7 | 439.1 | 391.3 | 311.1 | 167.9 | 0.0 |

Fig. 35

[Table 12]
Retention force (unit: N)

| Thickness t (mm) \ Escape distance R (mm) | 0.000 | 0.025 | 0.050 | 0.075 | 0.100 | 0.125 | 0.150 | 0.175 | 0.200 | 0.225 | 0.250 | 0.275 | 0.300 | 0.325 | 0.350 | 0.375 | 0.400 | 0.425 | 0.450 | 0.475 |
|---|---|---|---|---|---|---|---|---|---|---|---|---|---|---|---|---|---|---|---|---|
| 1.0 | 3.2 | 3.6 | 4.1 | 4.5 | 4.8 | 5.1 | 4.9 | 4.7 | 3.8 | 3.0 | 1.2 | 0.0 | 0.0 | 0.0 | 0.0 | 0.0 | 0.0 | 0.0 | 0.0 | 0.0 |
| 2.0 | 16.8 | 19.3 | 22.2 | 24.6 | 25.8 | 26.4 | 26.1 | 24.8 | 22.4 | 18.3 | 17.2 | 14.3 | 12.1 | 9.4 | 4.3 | 0.0 | 0.0 | 0.0 | 0.0 | 0.0 |
| 4.0 | 24.8 | 32.4 | 41.7 | 48.2 | 55.7 | 60.1 | 58.9 | 55.2 | 52.3 | 51.2 | 39.4 | 26.4 | 22.7 | 16.2 | 6.3 | 0.0 | 0.0 | 0.0 | 0.0 | 0.0 |
| 10.0 | 82.1 | 91.5 | 97.3 | 100.2 | 105.8 | 107.3 | 111.4 | 109.0 | 103.2 | 99.1 | 98.1 | 83.3 | 86.4 | 79.1 | 74.3 | 72.7 | 64.8 | 52.1 | 49.1 | 37.2 |

LASER CUTTING METHOD AND MACHINE, AND AUTOMATIC PROGRAMING APPARATUS

TECHNICAL FIELD

The present invention relates to a laser cutting method and machine, and an automatic programing apparatus.

BACKGROUND ART

When a processed part is cut from a plate-shaped workpiece by laser processing, the processed part may be caught in a plurality of pin supports on which the workpiece is placed or may rest on the workpiece to hinder movement of the laser processing head, or the processed part may go under the workpiece. In order to prevent the thing like this, the workpiece and the processed part are connected by a fine connection portion (joint portion) called a micro joint, and the processed part is prevented from being completely separated from the workpiece. In this case, if the processed part is removed from the workpiece, fine protrusions due to the micro joint may occur to the processed part, and a step of removing the fine protrusions is required. Therefore, it is proposed to connect a workpiece to a processed part without using a micro joint (refer to Patent Literature 1 or 2 described below).

Note that "micro joint" is generally joint processing to tie a processed part to a workpiece so that the processed part does not fall from the workpiece during laser processing, and is also called "wire joint". In micro joint processing, a processed part is tied to a workpiece by cutting the outline of the processed part while leaving a micro joint having a width of several micrometers to several hundreds micrometers.

CITATION LIST

Patent Literature

Patent Literature 1: Japanese Patent Application Laid-Open Publication No. H05-245671
Patent Literature 2: Japanese Patent Application Laid-Open No. H06-238475

SUMMARY

The above described Patent Literature 1 discloses a laser processing method that deters separation of a cut piece from a workpiece by supplying an adhesive onto a cut line (slit) of laser processing when cutting the cut piece (processed part) from the plate-shaped workpiece by laser processing. Accordingly, it is necessary to remove the adhesive when separating the cut piece from the workpiece.

The above described Patent Literature 2 discloses a laser processing method that deters separation of a product from a workpiece by further melting an edge of a cut slit that is cut, by laser and causing the melted residue to adhere to the workpiece when cutting the product from the workpiece by laser processing. Depending on the laser processing condition, the product may be melted by the melted residue, and the melted residue may firmly adhere to the product. In this case, it is necessary to remove the melted residue adhering to the product.

Further, a focused beam diameter of fiber laser with a wavelength in a 1 μm band is smaller as compared with a focused beam diameter of carbon dioxide gas laser with a wavelength in a 10 μm band, and therefore a cut slit by fiber laser is narrow. In cutting by carbon dioxide gas laser, the cut slit is wide, and therefore a cut piece slips among a plurality of pin supports and falls without being caught. However, since in cutting by fiber laser, the cut slit is narrow, there is a high possibility that the cut piece is caught in the workpiece, and there is a concern that movement of a laser processing head is hindered.

A first feature of the present invention provides a laser cutting method for cutting a processed part from a plate-shaped workpiece, including: (a) laser-cutting, in advance, a cut slit of a welding protruding-tab configured to be bent by laser cutting along an outline of the processed part and press a peripheral surface of the processed part in a periphery of the processed part that is cut from the workpiece; and (b) forming an outline slit by performing laser-cutting along the outline of the processed part and welding a free end of the welding protruding-tab to the peripheral surface of the processed part.

A second feature of the present invention provides a laser cutting machine cutting a processed part from a plate-shaped workpiece, and including: a laser processing head relatively movable in X-, Y- and Z-directions with respect to the workpiece; and a control device configured to control an operation of the laser processing head, wherein the control device comprises: a processing program memory configured to store a processing program for laser-cutting the processed part; a program analyzer configured to analyze the processing program and calculate a shape and dimensions of the processed part; a weight arithmetic section configured to calculate a weight of the processed part based on the shape and dimensions of the processed part that are analyzed, and a thickness of the workpiece; a number arithmetic section configured to calculate a number of welding protruding-tabs each of which bends and causes a free end of the welding protruding-tab to be welded to a peripheral surface of the processed part when an outline slit is formed by laser cutting along an outline of the processed part, based on an arithmetic calculation result of the weight arithmetic section; a welding protruding-tab arranger configured to arrange the welding protruding-tab in a periphery of the processed part, based on an arithmetic calculation result of the number arithmetic section; a processing program generator configured to generate a laser cutting program for forming the welding protruding-tab in a position arranged by the welding protruding-tab arranger; the processing program memory configured to store the laser cutting program generated by the processing program generator; and an axial motion controller configured to control axial motion of the laser processing head in accordance with the laser cutting program stored in the processing program memory.

A third feature of the present invention provides an automatic programing apparatus of a laser cutting machine, including: a weight arithmetic section configured to calculate a weight of a processed part based on a shape and dimensions of the processed part and a thickness t of a workpiece that are input from CAD; a number arithmetic section configured to calculate a number of welding protruding-tabs each of which bends and causes a free end of the welding protruding-tab to be welded to a peripheral surface of the processed part when an outline slit is formed by laser cutting along an outline of the processed part, based on an arithmetic calculation result of the weight arithmetic section; a welding protruding-tab arranger configured to arrange the welding protruding-tab in a periphery of the processed part, based on an arithmetic calculation result of the number arithmetic section; a processing program generator configured to generate a laser cutting program for forming the welding protruding-tab in a position arranged by the welding protruding-tab arranger, and laser-cutting the processed part; a processing program memory configured to store the laser cutting program generated by the processing program generator; and a program transferrer configured to transfer the laser cutting program stored in the processing program memory to a control device of the laser cutting machine.

According to the above described features, it is possible to retain the processed part by the welding protruding-tab reliably and stable for a long period, and it is possible to easily separate the processed part from the workpiece with almost no trace left on the processed part, by welding the free end of the welding protruding-tab and the peripheral surface of the processed part.

BRIEF DESCRIPTION OF DRAWINGS

FIG. 7 is a graph showing ranges of a preferable length L and a width W to a thickness t concerning the mild-steel-based material (SPCC).

FIG. 9 is a graph showing ranges of a preferable length L and width W to a thickness t concerning the stainless-steel-based material (SUS).

FIG. 11 is a graph showing ranges of a preferable length L and width W to the thickness t concerning the aluminum-based material (AL).

FIG. 17 is a graph showing changes in retention forces to dimensions of an embodiment and a micro joint concerning the mild-steel-based material (SPCC).

FIG. 18 is a graph showing changes in retention forces to dimensions of an embodiment and a micro joint concerning the stainless-steel-based material (SUS).

FIG. 19 is a graph showing changes in retention forces to dimensions of an embodiment and a micro joint concerning the aluminum-based material (AL).

FIG. 24 shows a Table 1.
FIG. 25 shows a Table 2.
FIG. 26 shows a Table 3.
FIG. 27 shows a Table 4.
FIG. 28 shows a Table 5.
FIG. 29 shows a Table 6.
FIG. 30 shows a Table 7.
FIG. 31 shows a Table 8.
FIG. 32 shows a Table 9.
FIG. 33 shows a Table 10.
FIG. 34 shows a Table 11.
FIG. 35 shows a Table 12.

DESCRIPTION OF EMBODIMENT

Figure 1:
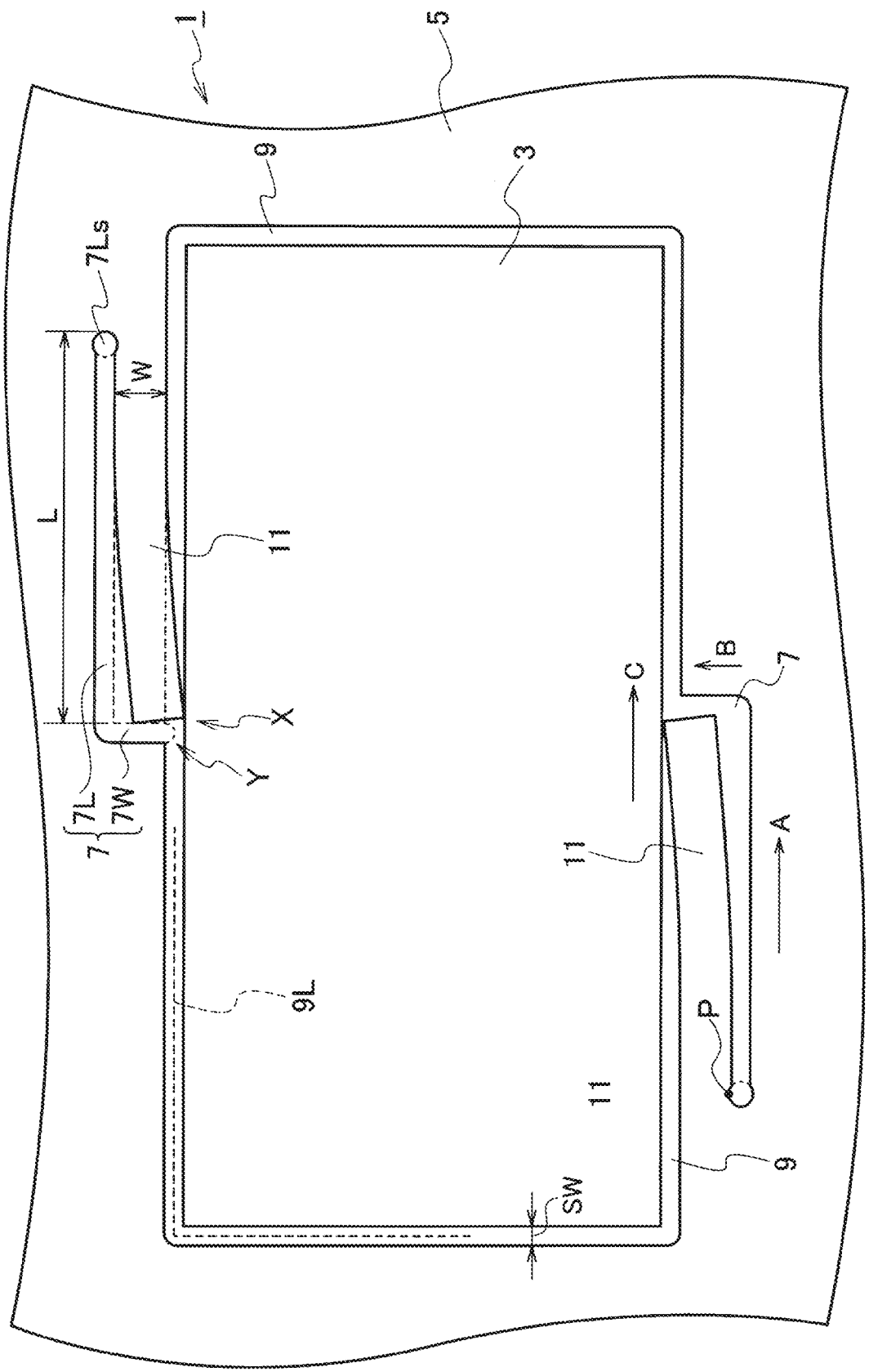
FIG. 1 is a plan view explaining a laser cutting method according to an embodiment.

A laser cutting method according to an embodiment will be described with reference to FIG. 1. A rectangular processed part 3 that is laser-cut is ultimately separated from a plate-shaped workpiece 1. However, the processed part 3 is tied to a scrap 5 that becomes unnecessary after laser cutting. In order to tie the processed part 3 to the scrap 5, a cut slit 7 is laser-cut in advance in at least one spot or more of the scrap 5. By performing laser-cutting along an outline 9L of the processed part 3 after forming the cut slit 7, a welding protruding-tab 11 in a cantilever shape is formed, and the processed part 3 is tied to the scrap 5 by the welding protruding-tab 11. Note that respective cut slits 7 are formed along the outline 9L of the processed part 3. When the outline 9L is laser-cut, an outline slit 9 is formed. Note that in FIG. 1, the outline 9L is illustrated in only a part of the outline slit 9. Further, a slit width of the outline slit 9 is illustrated as SW in FIG. 1. The outline 9L is located in a center of the slit width SW of the outline slit 9.

The cut slit 7 is formed into an L-shape by a length slit 7L and a width slit 7W. The length slit 7L includes a base-end hole 7Ls that will be described in detail later as a cutting start end of the length slit 7L. The length slit 7L is formed parallel with the outline 9L. The width slit 7W is formed perpendicularly to the length slit 7L. In other words, the cut slit 7 is formed by laser-cutting the length slit 7L in a direction of an arrow A in FIG. 1, and thereafter laser-cutting the width slit 7W in a direction of an arrow B successively. Thereafter, by performing laser-cutting in a direction of an arrow C along the outline 9L, the outline slit 9 is formed (the arrow C may be in an opposite direction, but the direction in the drawing is preferable). In the welding protruding-tab 11, residual stress exists due to an influence of heat of laser cutting at a time of forming the cut slit 7. When the outline 9L is laser-cut after formation of the cut slit 7, the aforementioned residual stress is released, and the welding protruding-tab 11 is bent toward the processed part 3 due to the residual stress. At the same time, a free end (tip end) of the welding protruding-tab 11 and a peripheral surface (peripheral edge) of the processed part 3 are welded by molten metal at a time of laser cutting and the processed part 3 is tied to the scrap 5. The processed part 3 is welded to the free end of the welding protruding-tab 11 at a joint portion X in FIG. 1, and is retained so as not to fall from the workpiece 1.

Figure 2:
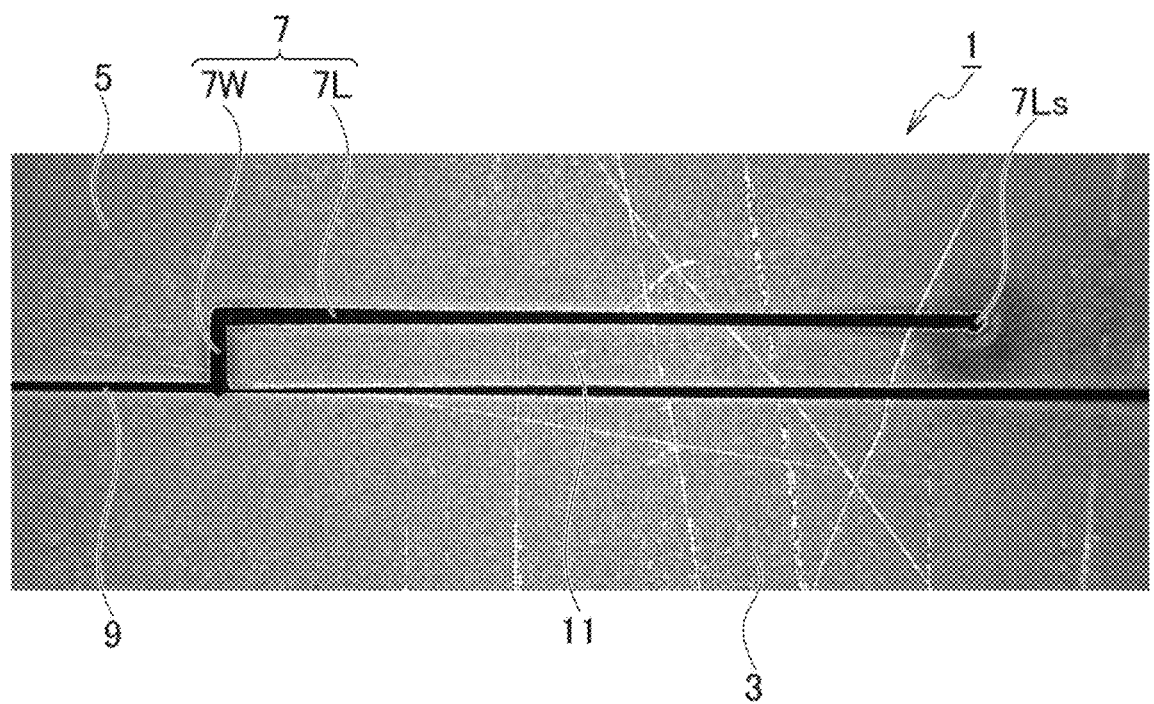
FIG. 2 is an image illustrating a welding protruding-tab formed by the above described method.

In FIG. 1, bend of the welding protruding-tab 11 is illustrated by being emphasized to be easily understood. FIG. 2 illustrates an image of the welding protruding-tab 11 that is actually processed. Note that a retention force by the single welding protruding-tab 11 depends on a material and a thickness t of the workpiece 1, and dimensions (a length L and a width W) of the welding protruding-tab 11. A weight of the processed part 3 changes according to a thickness t of the processed part 3 (=the thickness t of the workpiece 1) and an area of the processed part 3. Accordingly, the number of welding protruding-tabs 11 that are arranged in a periphery of the processed part 3 is determined according to the retention force by the single welding protruding-tab 11 and the weight of the processed part 3. Note that in FIG. 1, the length L is illustrated based on the welding protruding-tab 11 before deformation, and in the welding protruding-tab 11 after bending, the length L can be considered to be the same (refer to FIG. 2).

A relationship between the outline slit 9 and the tip end of the width slit 7W at a time of formation of the outline slit 9 is illustrated in FIG. 3(a) to FIG. 3(c). Here, an "escape distance R" is defined. The "escape distance R" is a length obtained by subtracting an overlap length OL of the width slit 7W and the outline slit 9 at the time of formation of the outline slit 9 from the slit width SW of the outline slit 9. The escape distance R is a length in a direction perpendicular to the outline 9L (outline slit 9). Accordingly, the escape distance R does not become larger than the slit width SW [R≤SW]. FIG. 3(a) illustrates a case where the escape distance R is equal to the slit width SW. FIG. 3(b) illustrates a case where the escape distance R is a half of the slit width SW of the outline slit 9. FIG. 3(c) illustrates a case where the escape distance R is zero. FIG. 3(a) to FIG. 3(c) illustrate states before formation of the outline slit 9, and the outline slit 9 is illustrated by virtual lines.

The base-end hole 7Ls that is the cutting start end of the cut slit 7 (length slit 7L) will be described. The base-end hole 7Ls is a through-hole. Further, when a radius of the base-end hole 7Ls is made larger than a radius of a pierced hole (mere through hole by piercing), it is possible promote deflection (bend) of the welding protruding-tab 11 that is formed to an outline slit 9 side. That is to say, it is possible to promote bend of the welding protruding-tab 11 and form a joint portion X with welding reliably by bringing a bend fulcrum P (point closest to the outline slit 9 or the outline 9L on an inner peripheral edge of the base-end hole 7Ls: refer to FIG. 1 and FIG. 4) of the welding protruding-tab 11 closer to the outline slit 9 or the outline 9L. Note that a width of a base end of the welding protruding-tab 11 (=W-[(radius of the base-end hole 7Ls)-(SW/2)]) is set so that the welding protruding-tab 11 is not folded at the base end (so as to secure sufficient rigidity to maintain the retention force). In other words, the radius of the base-end hole 7Ls (=W-[width of the base end of the welding protruding-tab 11]+[SW/2]) is set so that the welding protruding-tab 11 is not folded at a base end side (so as to secure sufficient rigidity to maintain the retention force).

Figure 4:
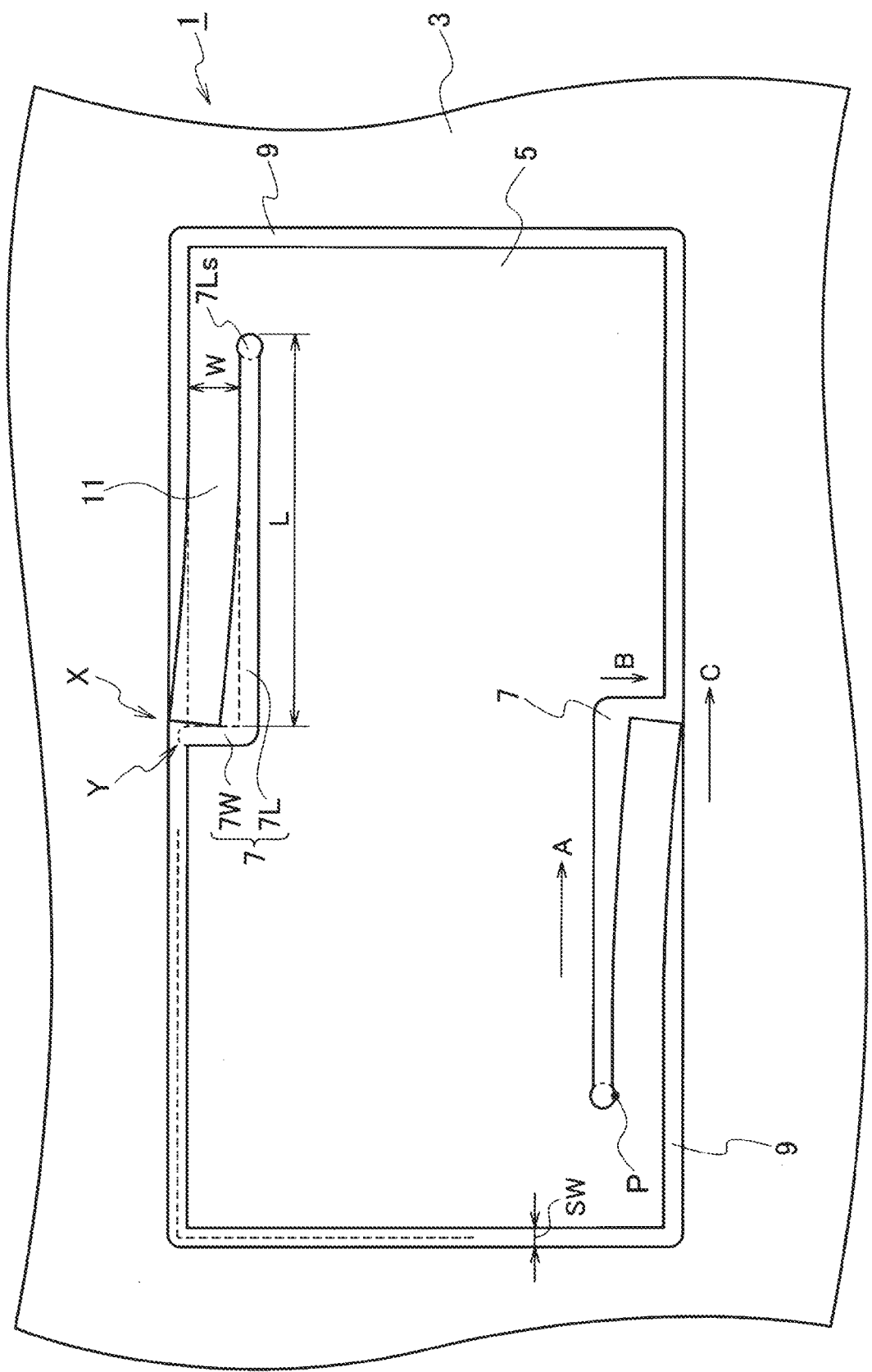
FIG. 4 is a plan view explaining a laser cutting method according to another embodiment.

FIG. 1 illustrates a case where an outer periphery of the processed part 3 is laser-cut, and the processed part 3 is held by the scrap 5 after cutting. Retention by the welding protruding-tab 11 can also be applied to a case where a hole is formed in the processed part 3 by laser-cutting. In this case, as illustrated in FIG. 4, an outline (outer periphery) of the hole is laser-cut, and the processed part 3 is caused to retain the scrap 5 corresponding to the hole after cutting. At this time, the free end of the welding protruding-tab 11 is pressed and welded to an inner peripheral surface (inner peripheral edge) of the hole, and forms the joint portion X with welding. When the hole is formed in the processed part 3, it is desirable to laser-cut the outline 9L of the hole (outline of the inner peripheral edge of the processed part 3) before laser-cutting the outline of the outer peripheral edge of the processed part 3, and laser-cut the outline of the outer peripheral edge of the processed part 3 thereafter. This is because the outline 9L of the hole is overwhelmingly shorter than the outline of the outer peripheral edge of the processed part 3 (that is to say, an area of the hole is overwhelmingly smaller than an area of the processed part 3/the scrap 5 on an inner side of the hole is overwhelmingly lighter than a total weight of the processed part 3 and the scrap and the retention force by the welding protruding-tab 11 is more effective for matters with lighter weights. Note that when a difference in weight is small, or when there is a restriction in processing, the outline 9L of the hole may be laser-cut after the outline of the outer peripheral edge of the processed part 3 is laser-cut.

As described above, in the present embodiment, the free end of the welding protruding-tab 11 is welded to the peripheral surface of the processed part 3, and the processed part 3 after cutting is tied to the scrap 5. However, even if the free end of the welding protruding-tab 11 and the peripheral surface of the processed part 3 are not welded, it is also possible to tie (retain) the processed part 3 to the scrap 5 by a press force following bend of the welding protruding-tab 11. However, the present inventors have found that it is possible to retain the processed part 3 more reliably and stably for a longer period by welding the free end of the welding protruding-tab 11 to the peripheral surface of the processed part 3. The inventors have found that there is a noticeable difference between retention by a mere pressing force and retention by welding. Further, the inventors have also found that the retention force by welding of the free end of the welding protruding-tab 11 and the peripheral surface of the processed part 3 is influenced by the aforementioned escape distance R.

The relationships between the dimensions (the lengths L and the widths W (mm)) of the welding protruding-tabs 11 and the retention forces (N) were actually measured by using the workpieces 1 made by a mild-steel-based material, a stainless-steel-based material, and an aluminum-based material. First, the relationship was measured by using a cold rolled steel sheet as the mild-steel-based material. Hereinafter, tables and graphs are shown by generically referring to the mild-steel-based material using an abbreviation of SPCC, using an abbreviation of SUS for the stainless-steel-based material, and using an abbreviation of AL for the aluminum-based material. Cutting was performed by using fiber laser. Further, in measurement here, the escape distance R=0.15 mm (=a half of the slit width SW of the outline slit 9=0.30 mm). Change in the retention force following a change in the escape distance R will be described in detail later. Further, in the measurement here, the diameter of the base-end hole 7Ls of the length slit 7L was set as the same as the width of the length slit 7L. That is to say, the base-end hole 7Ls is the mere cutting start end (the aforementioned pierced hole) of the length slit 7L. Note that it is obvious to a person skilled in the art that the slit width SW changes according to the thickness t. For example, when the thickness t increases, the slit width SW increases (the slit width SW is increased). Accordingly, as the thickness t increases, the escape distance R also increases.

Table 1 illustrated in FIG. 24 shows the relationship between the dimensions (the length L and the width W (mm)) of the welding protruding-tab 11 and the retention force (N) in SPCC with the thickness t=1.0 mm. The retention force shown in Table 1 is based on actual measurement. A size of the processed part 3 used in measurement is a square with a side of 65 mm, and the one welding protruding-tab 11 is formed on each side. The free end (joint portion X) of the welding protruding-tab 11 is located in a center of each of the sides. The retention force in the table is the retention force per one welding protruding-tab 11. Note that measurement with the thicknesses t=0.5 mm and 0.8 mm was tried, but it was not possible to form the joint portion X with welding. Accordingly, it has been found that concerning SPCC, a lower limit value of the thickness t is 1.0 mm.

A case where the retention force in the table is 0.0 shows that it was not possible to retain the processed part 3 by the formed welding protruding-tab 11 and the processed part 3 fell. A case where the retention force has a positive value shows that the formed welding protruding-tab 11 was able to retain the processed part 3. Of the cases where the processed part 3 was able to be retained, boxes each showing a case where the free end of the welding protruding-tab 11 and the peripheral surface of the processed part 3 are not welded and the processed part 3 is retained by only the press force following bend of the welding protruding-tab 11 are shown by thick dotted lines. Boxes each showing a case where the free end of the welding protruding-tab 11 and the peripheral surface of the processed part 3 are welded and the processed part 3 is retained are shown by thick solid lines.

Likewise, a case of SPCC with the thickness t=3.2 mm is shown in Table 2 illustrated in FIG. 25, and a case of SPCC with the thickness t=9.0 mm is shown in Table 3 illustrated in FIG. 26.

Figure 5:
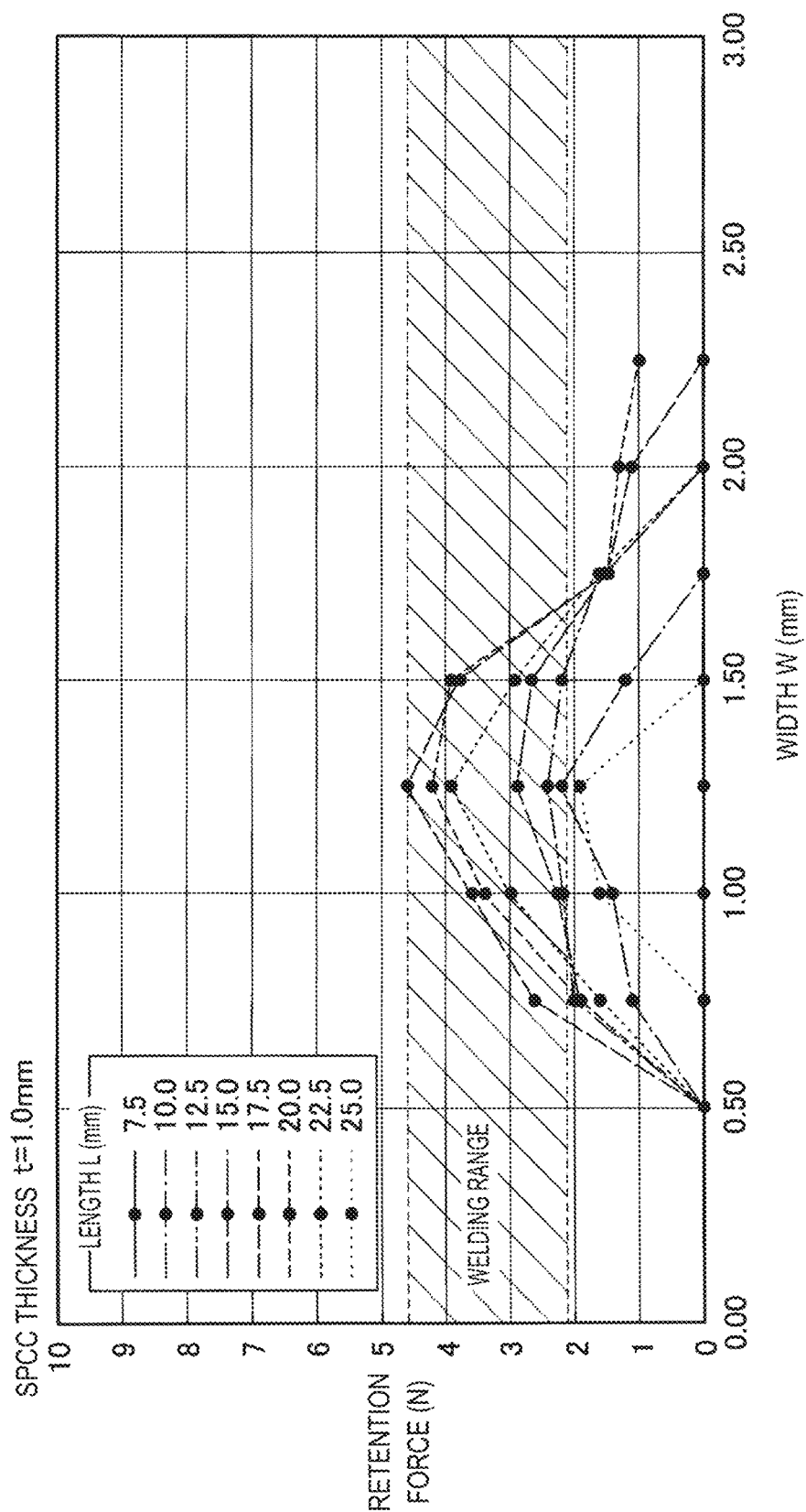
FIG. 5 is a graph showing a relationship between dimensions (a length L and a width W) of the welding protruding-tab and a retention force in a mild-steel-based material (SPCC) (thickness t=1.0 mm).
Figure 6:
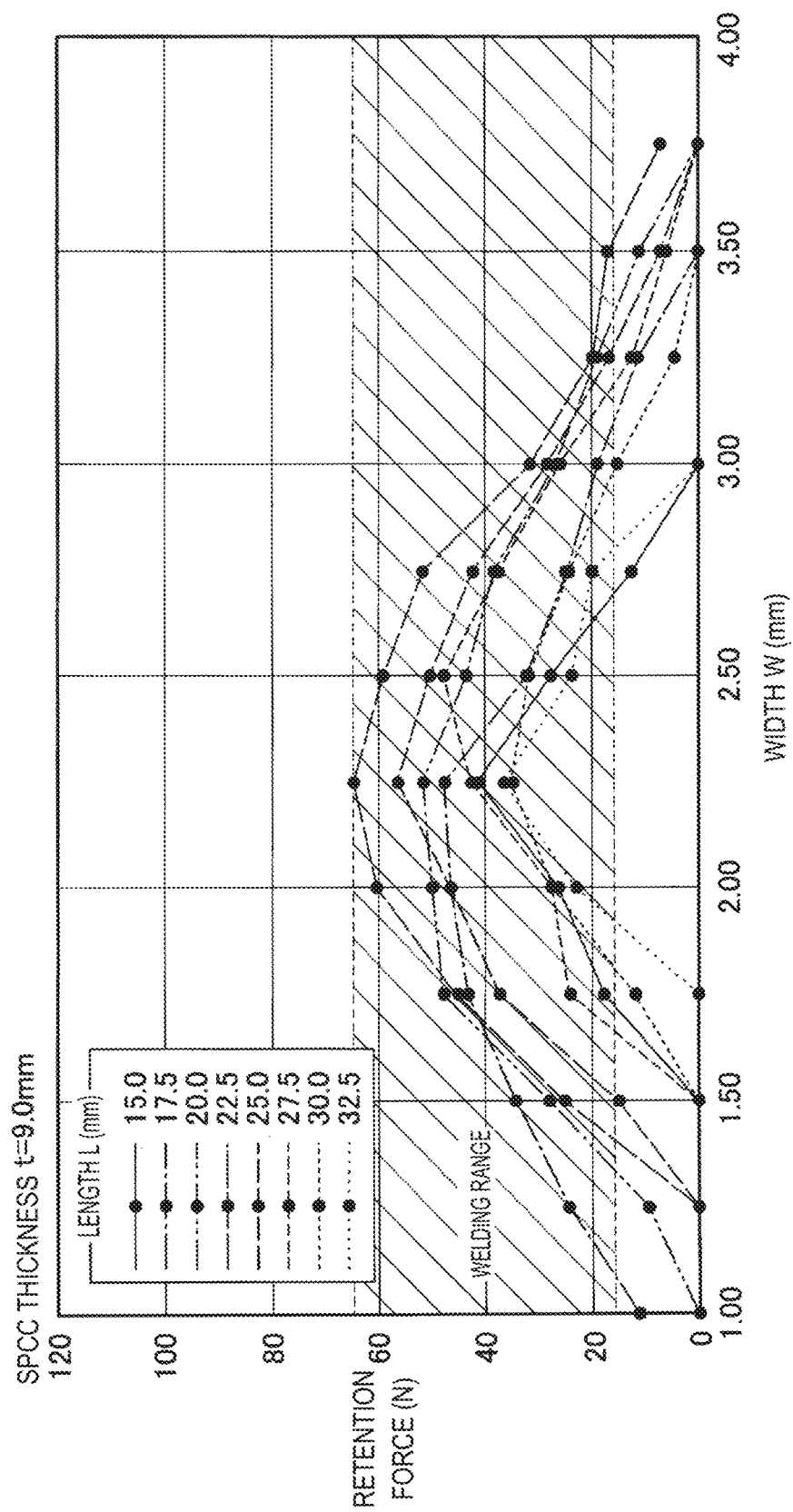
FIG. 6 is a graph showing a relationship between dimensions (a length L and a width W) of a welding protruding-tab and a retention force in a mild-steel-based material (SPCC) (thickness t=9.0 mm).

A graph of Table 1 is illustrated in FIG. 5, and a graph of Table 3 is illustrated in FIG. 6. In the graphs, horizontal axes each represent the width W (mm) of the welding protruding-tab 11, and vertical axes each represent a retention force (N). A sequential line is assigned to each of the lengths L (mm) of the welding protruding-tabs 11 (refer to legends in the graphs). In the graphs illustrated in FIG. 5 and FIG. 6, "welding ranges" in which the joint portions X with welding are formed are also shown. Note that an upper limit of the "welding range" is set at a maximum retention force that was measured.

As known from Table 1 to Table 3 and FIG. 5 and FIG. 6, it is known that in the dimensions (the length L and the width W) of the welding protruding-tab 11, a range where the joint portion X with welding is formed is present. The joint portion X with welding is not formed when the length L is too small and is not formed when the length L is too large. Likewise, the joint portion X with welding is not formed when the width W is too small, and is not formed when the width W is too large. Further, when parts where the retention force by a mere press force (boxes by thick dotted lines) or the retention force=0.0 N (boxes by thin dotted lines) and the retention force (boxes by thick solid lines) by the joint portion X with welding are adjacent are seen, the retention forces of the joint portions X with welding are one step improved in many cases. That is to say, significant improvement in the retention force is brought about by shifting to retention by the joint portion X with welding from retention by the mere press force (or non-retention).

Further, as the thickness t becomes larger, the range where the joint portion X with welding is formed becomes wider, and the range gradually tends to shift to increase in the length L and the width W (the plan dimensions of the welding protruding-tab 11 increasing). Further, when the joint portion X with welding is formed, the retention force tends to be larger as the thickness t becomes larger concerning the welding protruding-tabs 11 of the same plane dimensions (the length L and the width W). This is considered to be because a welding area of the joint portion X increases as the thickness t becomes larger (though a weight of the processed part 3 also increases as the thickness t becomes larger, an effect of the retention force increasing is more significant, and the processed part 3 can be retained without being caused to fall.)

Based on the measurement results, a preferable range to form the joint portion X with welding was obtained from the relationship with the thickness t with respect to each of the length L and the width W of the welding protruding-tab 11. Note that measurement of the retention force is also performed concerning thicknesses (t=2.3, 4.5 mm) other than the thicknesses shown in the tables and the graphs, and measurement results of the retention forces concerning these thicknesses are also used. First, with reference to FIG. 7(a), the length L is specifically explained.

In a measurement result of SPCC with the thickness t=1.0 mm, a range of the length L in which the joint portion X with welding is stably formed is a range of 12.5 to 22.5 mm, and a similar range of the width W is a range of 1.00 to 1.50 mm (refer to italicized numerical values in Table 1). In this way, concerning the thickness t=1.0 mm, an upper limit value and a lower limit value of the length L are obtained. Likewise, with respect to other thicknesses t, upper limit values and lower limit values of the length L are obtained (refer to italicized numerical values in the tables concerning the thicknesses t shown in Table 2 and Table 3). These upper limit values and lower limit values are plotted on a graph in which a horizontal axis represents the thickness t (mm) and a vertical axis represents the length L (mm), and an approximate straight line is obtained by a known method with respect to each of the upper limit value and the lower limit value.

As a result, concerning SPCC, an approximate straight line of a lower limit of the length L is obtained as a function of the thickness t as in expression (1) below.

$$L = 0.5294t + 12.8825 \qquad (1)$$

Likewise, an approximate straight line of an upper limit of the length L is obtained as a function of the thickness t as in expression (2) below.

$$L = 0.6948t + 21.2208 \qquad (2)$$

That is to say, concerning SPCC, a preferable range of the length L of the welding protruding-tab 11 for the thickness t is obtained as expression (3) below from expression (1) and expression (2) described above.

$$(0.5294t + 12.8825) \leq L \leq (0.6948t + 21.2208) [t \geq 1.0] \qquad (3)$$

Next, with reference to FIG. 7(b), the width W will be specifically described. Likewise, a preferable range of the width W with respect to SPCC is obtained. As described above, in the measurement result of SPCC with the thickness t=1.0 mm, a range of the width W in which the joint portion X with welding is stably formed is a range of 1.00 to 1.50 mm (refer to the italicized numerical values in Table 1). In this way, an upper limit value and a lower limit value of the width W are obtained concerning the thickness t=1.0 mm. Likewise, with respect to other thicknesses t, upper limit values and lower limit values of the width W are obtained (concerning the thicknesses t shown in Table 2 and Table 3, refer to the italicized numerical values in the tables). These upper limit values and lower limit values are plotted on a graph in which a horizontal axis represents the thickness t (mm), and a vertical axis represents the width W (mm), and an approximate straight line is obtained with respect to each of the upper limit value and the lower limit value.

As a result, concerning SPCC, an approximate straight line of a lower limit of the width W is obtained as a function of the thickness t as expression (4) below.

$$W=0.0973t+0.8609 \tag{4}$$

Likewise, an approximate straight line of an upper limit of the width W is obtained as a function of the thickness t as expression (5) below.

$$W=0.1833t+1.3168 \tag{5}$$

That is to say, concerning SPCC, the preferable range of the width W of the welding protruding-tab 11 to the thickness t is obtained as expression (6) below from expressions (4) and (5) described above.

$$(0.0973t+0.8609) \le W \le (0.1833t+1.3168)[t \ge 1.0] \tag{6}$$

It is possible to form the joint portion X with welding stably by forming the welding protruding-tab 11 having the thickness t, the length L and the width W that establish both expression (3) and expression (6) described above, with respect to SPCC. Note that the thickness t is also a thickness of the workpiece 1.

Next, the stainless-steel-based material (SUS) will be described. Table 4 illustrated in FIG. 27 shows a relationship between dimensions (a length L and a width W (mm)) of the welding protruding-tab 11 and a retention force (N) in SUS with a thickness t=1.0 mm. Likewise, a case of SUS with the thickness t=4.0 mm is shown in Table 5 illustrated in FIG. 28, and a case of SUS with the thickness t=10.0 mm is shown in Table 6 illustrated in FIG. 29. Note that it was not possible to form the joint portion X with welding, with the thicknesses t=mm or 0.8 mm. Accordingly, it has been found that a lower limit value of the thickness t is also 1.0 mm concerning SUS.

Figure 8:
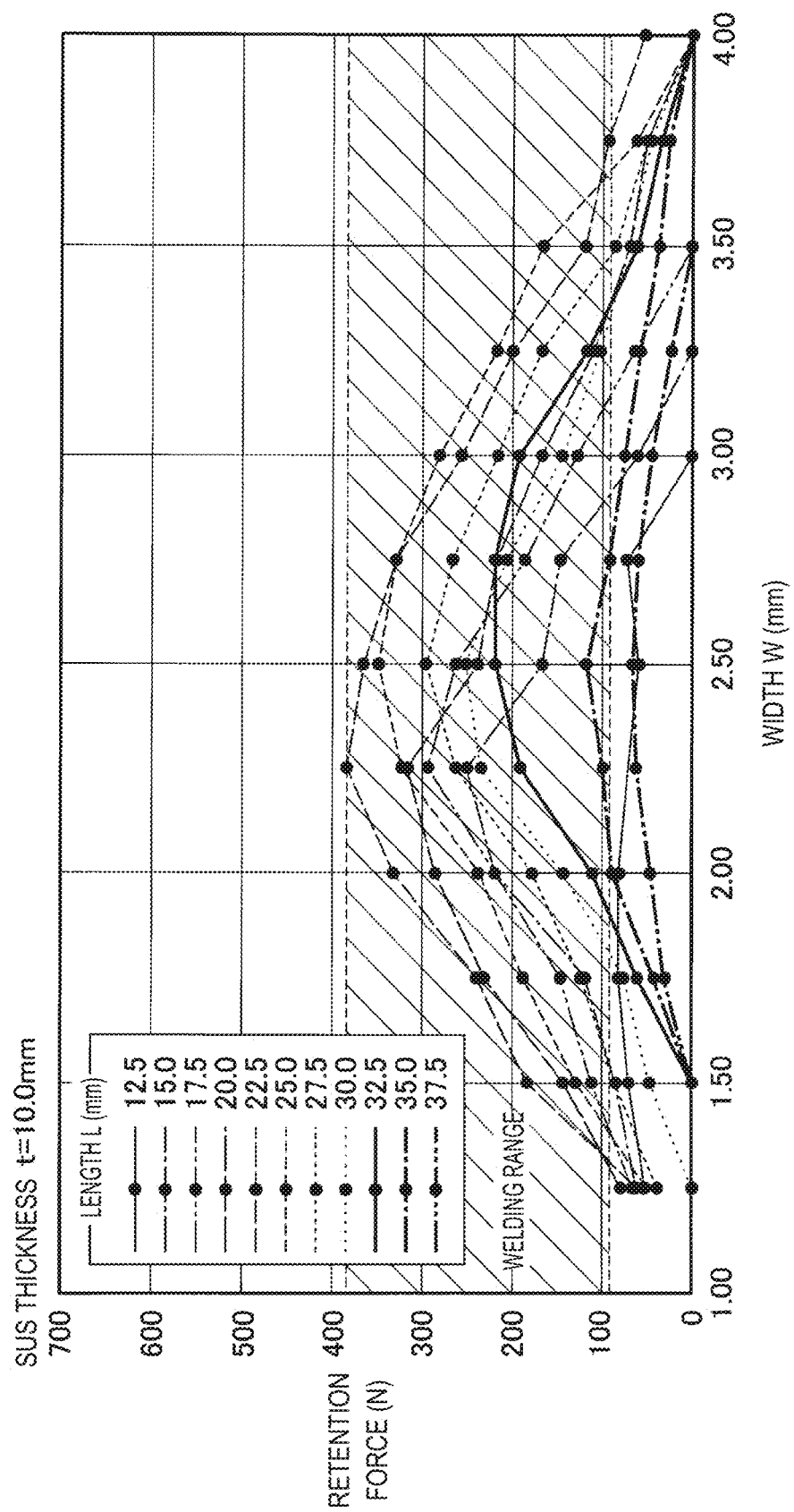
FIG. 8 is a graph showing a relationship between dimensions (a length L and a width W) of a welding protruding-tab and a retention force in a stainless-steel-based material (SUS) (thickness t=10.0 mm).

Further, a graph of Table 6 is illustrated in FIG. 8. As is known from Table 4 to Table 6 and FIG. 8, it is found that concerning SUS, there is also the aforementioned tendency similar to SPCC with respect to the relationship between the dimensions (the length L and the width W (mm)) of the welding protruding-tab 11 and the retention force (N) though absolute values are different. (Therefore, only the graph of the thickness t=10.0 mm is illustrated.) Accordingly, with respect to SUS, a preferable range for forming the joining portion X with welding was obtained from the relationship with the thickness t with respect to each of the length L and the width W of the welding protruding-tab 11. Note that measurement of a retention force is also performed concerning the thickness (t=2.0 mm) other than the thicknesses shown in the tables and graph, and these measurement results are also used.

Approximate straight lines for the length L are illustrated in FIG. 9(a). Concerning SUS, an approximate straight line of a lower limit of the length L is obtained as a function of the thickness t as expression (7) below.

$$L=0.8718t+11.2949 \tag{7}$$

Likewise, an approximate straight line of an upper limit of the length L is obtained as a function of the thickness t as expression (8) below.

$$L=1.5769t+16.4231 \tag{8}$$

That is to say, concerning SUS, a preferable range of the length L of the welding protruding-tab 11 to the thickness t is obtained as expression (9) below from expression (7) and expression (8) described above.

$$(0.8718t+11.2949) \le L \le (1.5769t+16.4231)[t \ge 1.0] \tag{9}$$

Likewise, approximate straight lines with respect to the width W are illustrated in FIG. 9(b). Concerning SUS, an approximate straight line of a lower limit of the width W is obtained as a function of the thickness t as expression (10) below.

$$W=0.1167t+0.8167 \tag{10}$$

Likewise, an approximate straight line of an upper limit of the width W is obtained as a function of the thickness t as expression (11) below.

$$W=0.1923t+1.3077 \tag{11}$$

That is to say, concerning SUS, a preferable range of the width W of the welding protruding-tab 11 to the thickness t is obtained as expression (12) below from expression (10) and expression (11) described above.

$$(0.1167t+0.8167) \le W \le (0.1923t+1.3077)[t \ge 1.0] \tag{12}$$

It is possible to form the joint portion X with welding stably by forming the welding protruding-tab 11 having the thickness t, the length L and the width W that establish both expression (9) and expression (12) described above, with respect to SUS. Note that the thickness t is also the thickness of the workpiece 1.

Next, the aluminum-based material (AL) will be described. Table 7 illustrated in FIG. 30 shows a relationship between dimensions (a length L and a width W (mm)) of the welding protruding-tab 11 and a retention force (N) in AL with a thickness t=1.0 mm. Likewise, a case of SUS with the thickness t=4.0 mm is shown in Table 8 illustrated in FIG. 31, and a case of SUS with the thickness t=10.0 mm is shown in Table 9 illustrated in FIG. 32. Note that it was not possible to form the joint portion X with welding, with the thicknesses t=0.5 mm or 0.8 mm. Accordingly, it has been found that a lower limit value of the thickness t is also 1.0 mm concerning AL.

Figure 10:
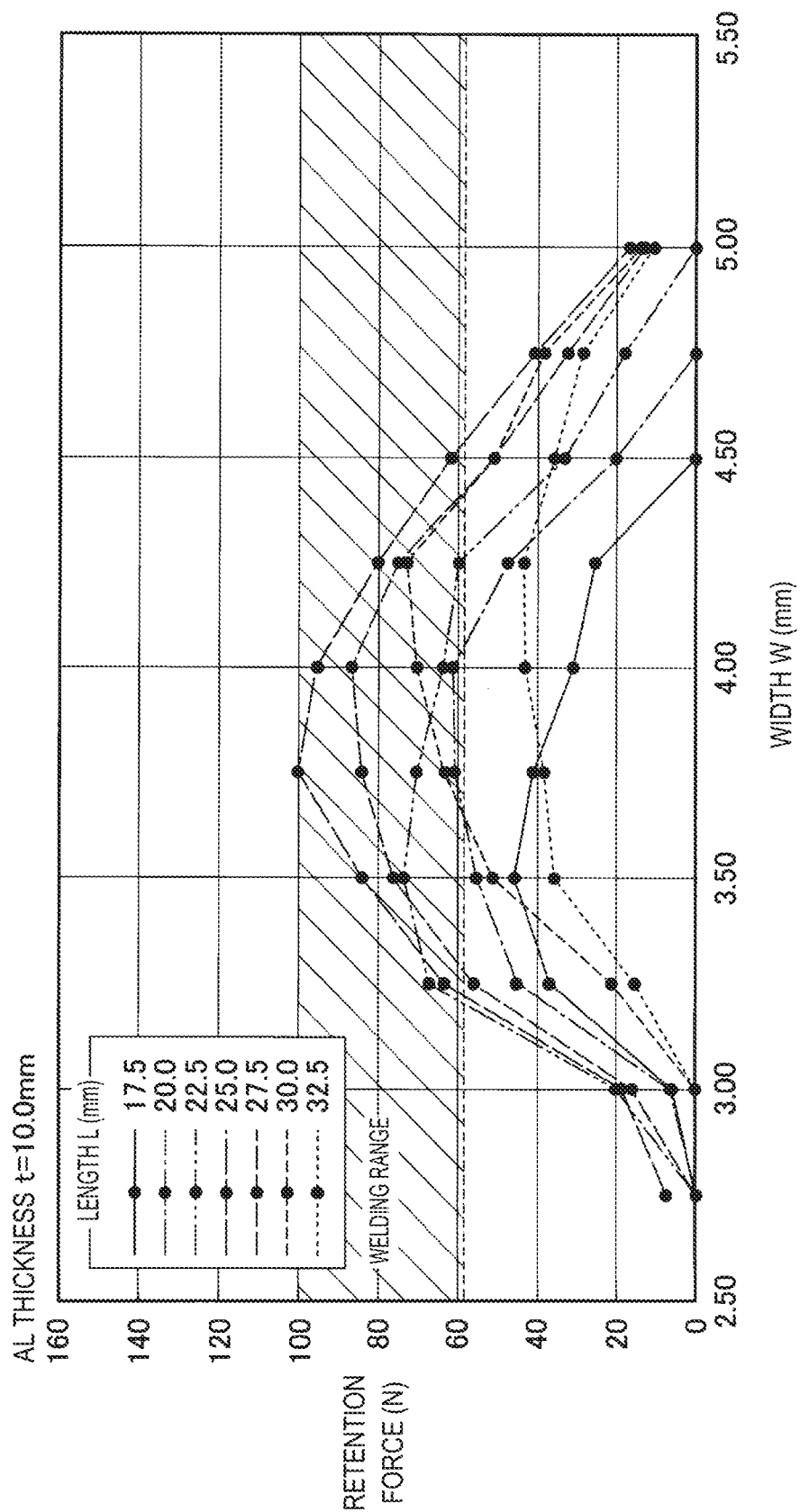
FIG. 10 is a graph showing a relationship between dimensions (a length L and a width W) of a welding protruding-tab and a retention force in an aluminum-based material (AL) (thickness t=10.0 mm).

Further, a graph of Table 9 is illustrated in FIG. 10. As is known from Table 7 to Table 9 and FIG. 10, it is known that concerning AL, there is also the aforementioned tendency similar to SPCC and SUS with respect to the relationship between the dimensions (the length L and the width W (mm)) of the welding protruding-tab 11 and the retention force (N) though absolute values are different. (Therefore, only the graph of the thickness t=10.0 mm is illustrated.) Accordingly, with respect to AL, a preferable range for forming the joint portion X with welding was also obtained from the relationship with the thickness t with respect to each of the length L and the width W of the welding protruding-tab 11. Note that measurement of a retention force is also performed concerning a thickness (t=2.0 mm) other than the thicknesses shown in the tables and graph, and these measurement results are also used.

Approximate straight lines for the length L are illustrated in FIG. 11(a). Concerning AL, an approximate straight line of a lower limit of the length L is obtained as a function of the thickness t as expression (13) below.

$$L=1.4615t+7.5385 \quad (13)$$

Likewise, an approximate straight line of an upper limit of the length L is obtained as a function of the thickness t as expression (14) below.

$$L=1.7436t+12.5897 \quad (14)$$

That is to say, concerning AL, a preferable range of the length L of the welding protruding-tab 11 to the thickness t is obtained as expression (15) below from expression (13) and expression (14) described above.

$$(1.4615t+7.5385) \leq L \leq (1.7436t+12.5897)[t \geq 1.0] \quad (15)$$

Likewise, approximate straight lines with respect to the width W are illustrated in FIG. 11(b). Concerning AL, an approximate straight line of a lower limit of the width W is obtained as a function of the thickness t as expression (16) below.

$$W=0.2910t+0.8256 \quad (16)$$

Likewise, an approximate straight line of an upper limit of the width W is obtained as a function of the thickness t as expression (17) below.

$$W=0.3064t+1.2603 \quad (17)$$

That is to say, concerning AL, a preferable range of the width W of the welding protruding-tab 11 to the thickness t is obtained as expression (18) below from expression (16) and expression (17) described above.

$$(0.2910t+0.8256) \leq W \leq (0.3064t+1.2603)[t \geq 1.0] \quad (18)$$

It is possible to form the joint portion X with welding stably by forming the welding protruding-tab 11 having the thickness t, the length L and the width W that establish both expression (15) and expression (18) described above, with respect to AL. Note that the thickness t is also the thickness of the workpiece 1.

Next, the aforementioned "escape distance R" will be described in detail. Table 10 illustrated in FIG. 33 shows a result of measuring a relationship between the escape distance R (mm) and the retention force (N) in SPCC. The retention force shown in Table 10 is based on actual measurement. A size of the processed part 3 used in measurement is a square with a side of 65 mm, and the one welding protruding-tab 11 is formed on each side. The free end (joint portion X) of the welding protruding-tab 11 is located in a center of each side. The retention force in the table is the retention force per one welding protruding-tab 11. The dimensions (the length L and the width W (mm)) of the welding protruding-tab 11 used in measurement here were determined based on the results (refer to Tables 1 to 3: the escape distance R is a half of the slit width SW) used to obtain expression (3) and expression (6) described above.

Specifically, the relationship between the escape distance R and the retention force was measured by using the dimensions (the length L and the width W) of the welding protruding-tab 11 recording a maximum retention force (welding peak value) for each thickness t. That is to say, in the case of the thickness t=1.0 mm, the welding protruding-tab 11 with the length L=17.5 mm and the width W=1.25 mm was used for the measurement (refer to Table 1). Likewise, in a case of the thickness t=2.3 mm, the welding protruding-tab 11 with the length L=17.5 mm and the width W=1.25 mm was used. In the case of the thickness t=3.2 mm, the welding protruding-tab 11 with the length L=17.5 mm and the width W=1.75 mm was used (refer to Table 2). In a case of the thickness t=4.5 mm, the welding protruding-tab 11 with the length L=17.5 mm and the width W=1.50 mm was used. In the case of the thickness t=9.0 mm, the welding protruding-tab 11 with the length L=22.5 mm and the width W=2.25 mm was used (refer to Table 3).

The case where the retention force in the table is 0.0 shows that the processed part 3 fell. Boxes each showing the case where the joint portion X with welding was formed are shown by thick dotted lines. Among them, the boxes showing cases where the retention forces have maximum values in the respective thicknesses t are shown by thick solid lines.

Figure 12:
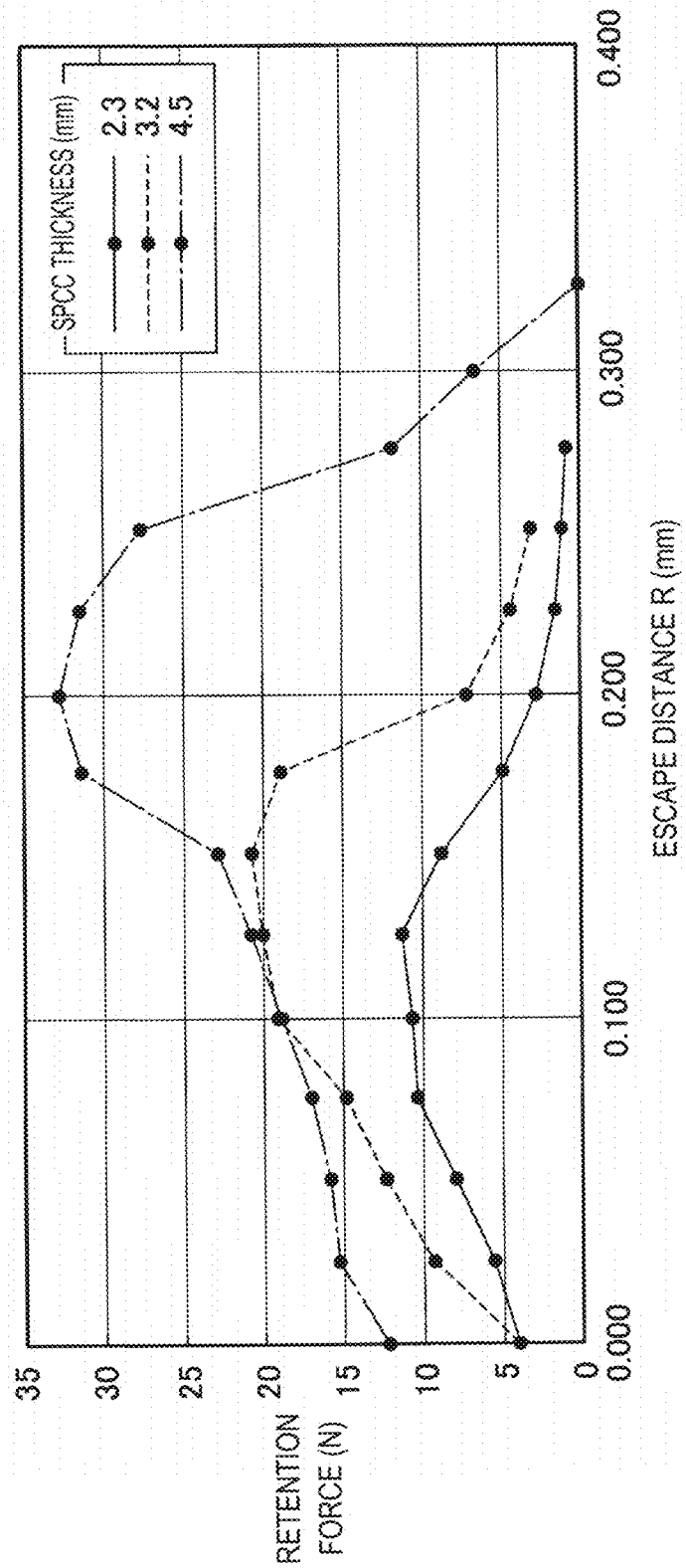
FIG. 12 is a graph illustrating a relationship between an escape distance R and a retention force in the mild-steel-based material (SPCC).

Further, a graph of Table 10 is illustrated in FIG. 12. Note that the graph in FIG. 12 illustrates only cases of the thicknesses t=2.3 mm, 3.2 mm, and 4.5 mm. Further, the graph in FIG. 12 also includes a case of the retention force by a mere press force without welding (side at which the escape distance R is large). As is known from Table 10 and FIG. 12, in each of the thicknesses t, there is a similar tendency between the escape distance R and the retention force. That is to say, when the escape distance R is small, the retention force becomes small, and when the escape distance R is large, the retention force also becomes small. A maximum value of the retention force is recorded in an approximately center of a range where the joint portion X with welding is formed, though an absolute value of the escape distance R recording the maximum value of the retention force differs at each of the thicknesses t.

Figure 13:
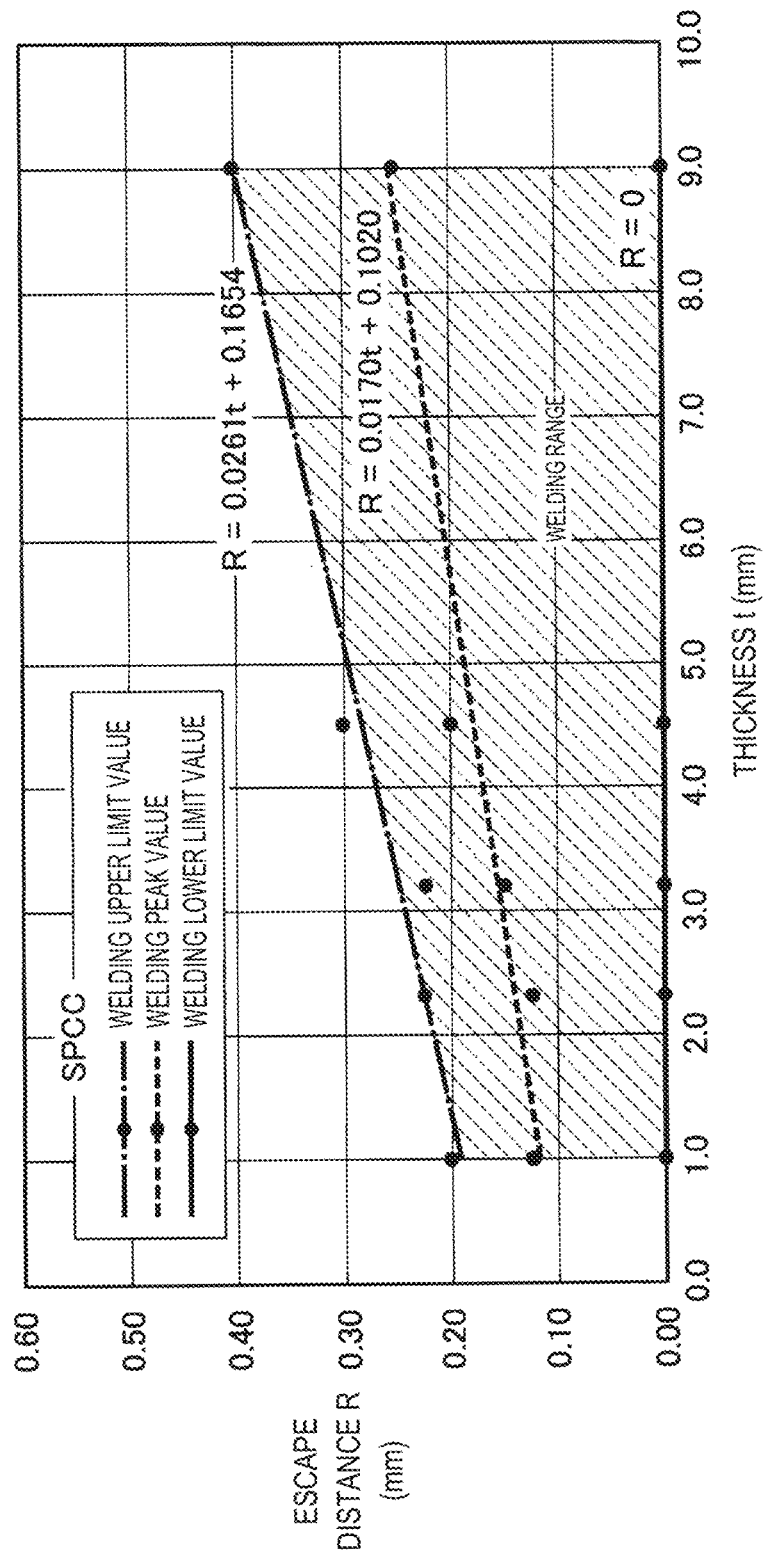
FIG. 13 is a graph showing a range of a preferable escape distance R to the thickness t concerning the mild-steel-based material (SPCC).

Furthermore, based on the measurement result in Table 10, a preferable range of the escape distance R was obtained from a relationship with the thickness t. Referring to FIG. 13, explanation will be made specifically. First, an upper limit of the escape distance R with which the joint portion X with welding is formed is obtained. An upper limit value (welding upper limit value) with which the joint portion X with welding is formed is plotted on a graph in which a horizontal axis represents a thickness t (mm) and a vertical axis represents the escape distance R (mm), for each thickness t, and an approximate straight line is obtained by a known method. More specifically, when (the thickness t, the escape distance R)=(1.0, 0.200), (2.3, 0.225), (3.2, 0.225), (4.5, 0.300), and (9.0, 0.400) are plotted and the approximate straight line is obtained, an approximate straight line of the upper limit of the escape distance R is obtained as a function of the thickness t as expression (19) below, concerning SPCC.

$$R=0.0261t+0.1654 \quad (19)$$

Next, a lower limit of the escape distance R with which the joint portion X with welding is formed is obtained. A lower limit value (welding lower limit value) with which the joint portion X with welding is formed is the escape distance R=0.000 mm at any thickness t as shown in Table 10, and therefore, expression (20) below is obtained as a constant function.

$$R=0 \quad (20)$$

However, it is concerned that if the escape distance R is small, sufficient welding is not realized, as described later with reference to FIG. 3(c). Accordingly, it is preferable that at least the width slit 7W and the outline slit 9 are not completely overlapped, that is, $0 < R (\leq SW)$ is established.

Accordingly, expression (20)' below is obtained, instead of expression (20) described above.

$$R>0 \quad (20)'$$

That is to say, concerning SPCC, a preferable range of the escape distance R to the thickness t is obtained as expression (21) below from expression (19) and expression (20)' described above.

$$0 < R \le (0.0261t+0.1654)[t \ge 1.0] \qquad (21)$$

Figure 14:
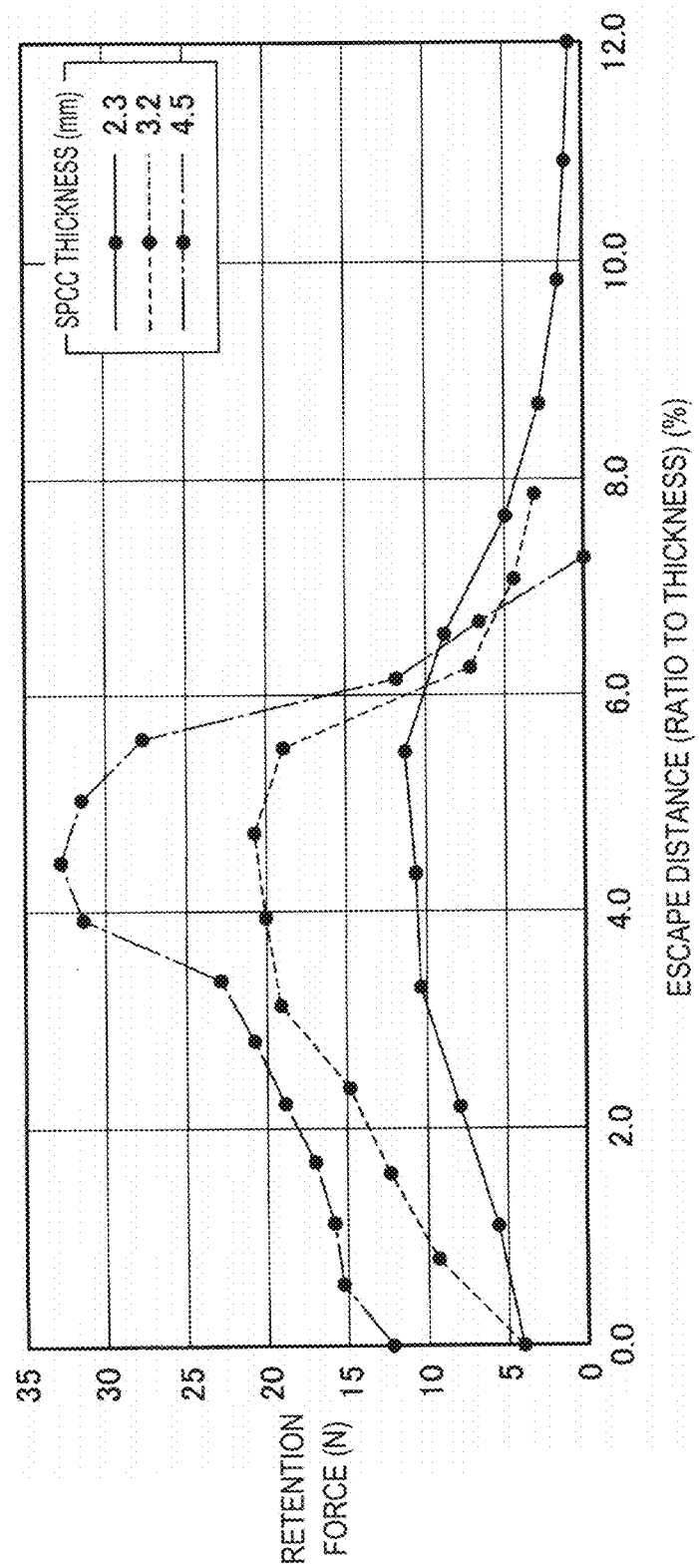
FIG. 14 is a graph showing a relationship between a ratio of an escape distance to a thickness and retention force in the mild-steel-based material (SPCC).

Further, FIG. 14 illustrates an approximate straight line obtained by using a maximum retention force (welding peak value) at each of the thicknesses t described above. Concerning SPCC, an approximate straight line of the welding peak value of the escape distance R is obtained as a function of the thickness t as expression (22) below.

$$R = 0.0170t+0.1020 \qquad (22)$$

Figure 3:
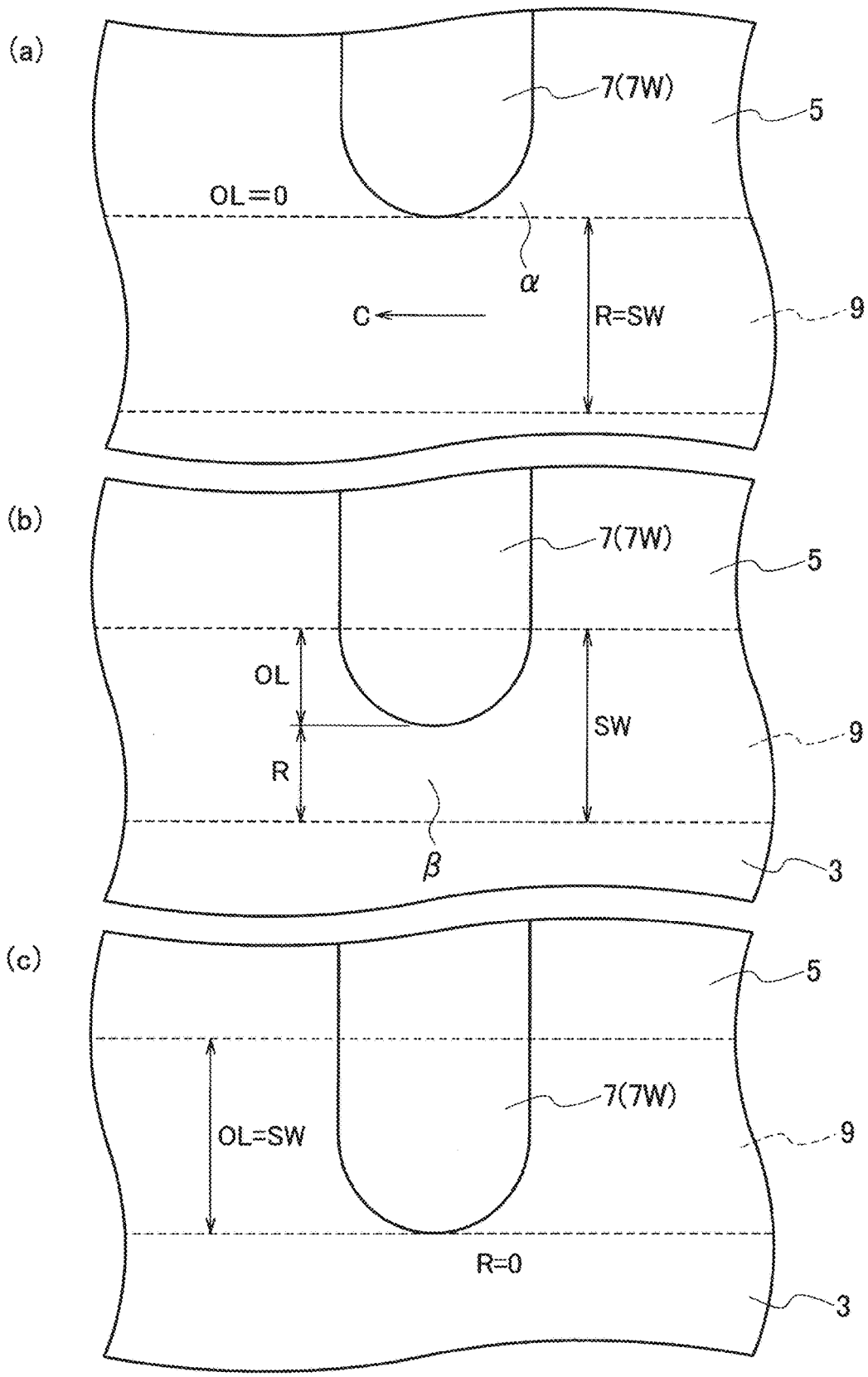
FIG. 3 is an enlarged plan view illustrating escape distances at a time of forming the welding protruding-tab by the above described method.

Here, it is conceivable that the retention force becomes small when the escape distance R is large because an a portion in FIG. 3(*a*) is formed at a tail end of the length slit 7L. Since the α portion is melted and welded to the peripheral surface of the processed part 3 and the joint portion X is formed, formation of the a portion is considered to influence welding. While it is considered to be preferable that the press force acts on the welding portion at the time of welding, the press force acting on the welding portion is considered to be dispersed when the α portion is formed.

On the other hand, the reason why the retention force is small when the escape distance R is small is considered to be that (a portion at an outline slit 9 side, of) the free end of the welding protruding-tab 11 is not sufficiently melted because laser cutting is not performed and heat is not generated when the laser beam crosses the tail end of the width slit 7W at the time of formation of the outline slit 9, as illustrated in FIG. 3(*c*). In particular, when the laser beam crosses the tail end of the width slit 7W, not only no heat is generated, but also assist gas cools surroundings (including the free end of the welding protruding-tab 11 and the peripheral surface of the processed part 3) with overlap portions of the width slit 7W and the outline slit 9 as a center, and therefore the free end of the welding protruding-tab 11 is more difficult to weld.

Here, a reason why the retention force reaches a peak when the escape distance R has a substantially half a value of the slit width SW is considered to be that heat generation is also maintained by a β portion when the laser beam crosses the tail end of the width slit 7W and a melted portion is reliably formed, as illustrated in FIG. 3(*b*). It is considered that the reason is not only that, but also the free end of the welding protruding-tab 11 is formed as a right-angled corner portion and therefore the press force sufficiently acts on the welding portion (the press force is concentrated on the corner portion instead of being distributed over a wide area). Further, as a result that the β portion is formed, heat at the time of laser-cutting of the outline slit 9 is also transferred to surroundings (including the free end of the welding protruding-tab 11 and the peripheral surface of the processed part 3) of the outline slit 9 via the β portion, and therefore, it is considered that the influence by cooling by the assist gas as described above is small.

Further, in the graph in FIG. 12, the horizontal axis represents the absolute value of the escape distance R. FIG. 14 illustrates a result of converting the escape distance R of the horizontal axis into a ratio (relative value) to the thickness t. As is understood from the graph in FIG. 14, a peak value of the retention force is obviously correlated with the escape distance R as a relative value to the thickness t. The correlation shows the same tendency in the aforementioned welding lower limit value and welding upper limit value, and maximum values—are recorded with substantially the same escape distances R (correlation values: around 4.5%). Accordingly, from these results, the escape distance R is preferably 3.0 to 6.0% to the thickness t, and especially preferably 3.5 to 5.5%. When the escape distance R (correlation value) is less than a lower limit value of the range, or exceeds an upper limit value, the retention force is reduced. Rather, when the escape distance R (correlation value) is within the range of these values, the retention force is more enhanced than outside the range (the tendency is more remarkable as the thickness t becomes larger).

Figure 15:
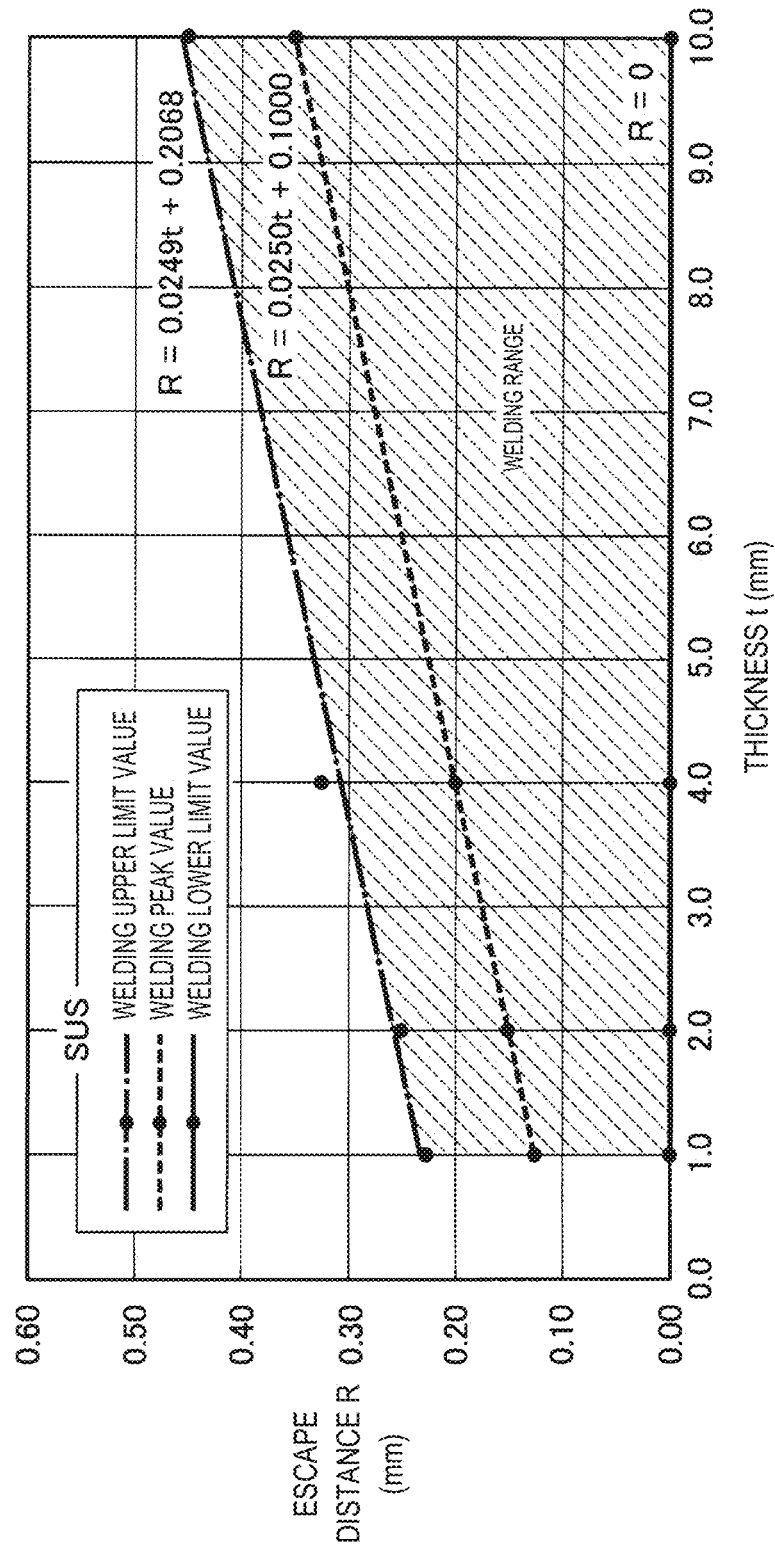
FIG. 15 is a graph showing a range of a preferable escape distance R to the thickness t concerning the stainless-steel-based material (SUS).

Table 10 shows the relationship between the escape distance R and the retention force in SPCC. A relationship between an escape distance R (mm) and a retention force (N) was also measured similarly concerning SUS. Table 11 illustrated in FIG. 34 shows a result of measuring the relationship between the escape distance R and the retention force in SUS. Further, FIG. 15 illustrates a preferable range of the escape distance R to the thickness t, which was obtained based on the measurement result in Table 11. That is to say, concerning SUS, the preferable range of the escape distance R to the thickness t is obtained as expression (23) below.

$$0 < R \le (0.0249t+0.2068)[t \ge 1.0] \qquad (23)$$

Further, FIG. 15 illustrates approximate straight lines obtained by using a maximum retention force (welding peak value) at each of the thicknesses t described above. Concerning SUS, an approximate straight line of the welding peak value of the escape distance R is obtained as a function of the thickness t as expression (24) below.

$$R = 0.0250t+0.1000 \qquad (24)$$

Figure 16:
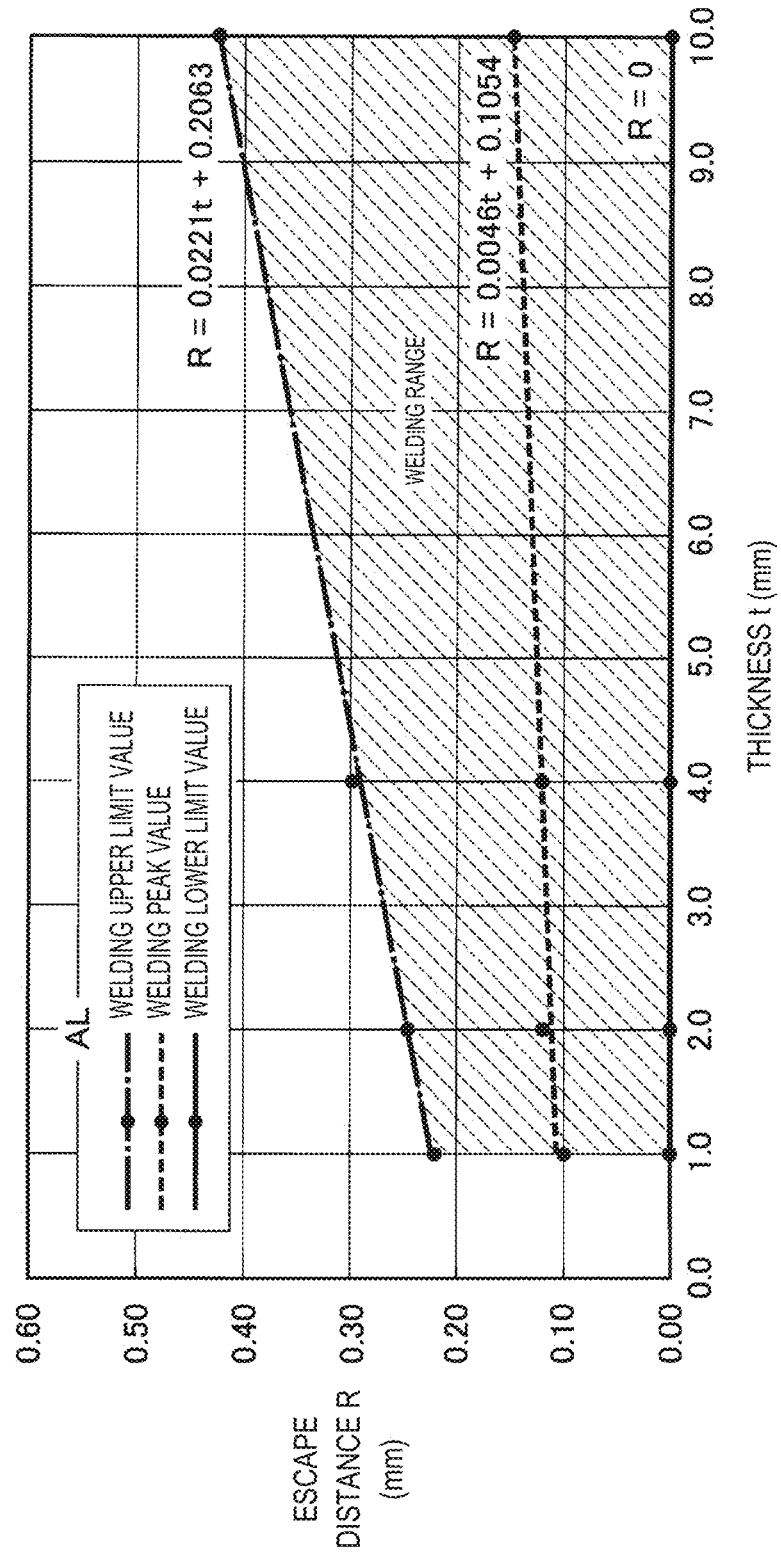
FIG. 16 is a graph showing a range of a preferable escape distance R to the thickness t concerning the aluminum-based material (AL).

A relationship between an escape distance R (mm) and a retention force (N) was also measured similarly concerning AL. Table 12 illustrated in FIG. 35 shows a result of measuring the relationship between the escape distance R and the retention force in AL. Further, FIG. 16 illustrates a preferable range of the escape distance R to the thickness t, which was obtained based on the measurement result in Table 12. That is to say, concerning AL, the preferable range of the escape distance R to the thickness t is obtained as expression (25) below.

$$0 < R \le (0.0221t+0.2063)[t \ge 1.0] \qquad (25)$$

Further, FIG. 16 also illustrates an approximate straight line obtained by using the maximum retention force (welding peak value) at each of the thicknesses t described above. Concerning AL, the approximate straight line of the welding peak values of the escape distances R is obtained as a function of the thickness t as expression (26) below.

$$R = 0.0046t+0.1054 \qquad (26)$$

Here, one of advantages of the joint portion X with welding, over micro joints will be described with reference to FIG. 17 to FIG. 19. FIG. 17(*a*) is a graph of data (including the maximum retention force) of the welding protruding-tab 11 with the width W=1.25 mm in Table 1 described above (SPCC: thickness t=1.0 mm). The graph in FIG. 17 (*a*) shows that it is possible to control the retention force by changing the length L of the welding protruding-tab 11 by several millimeters. FIG. 17(*b*) illustrates change in the retention force to the width of a micro joint. Certainly, this is the case of SPCC: thickness t=1.0 mm. A graph in FIG. 17(*b*) shows that the retention force significantly changes as a result of the width of the micro joint changing by only several sub-millimeters.

That is to say, it is possible to control the retention force more easily by using the joint portion X with welding of the welding protruding-tab 11 in the present embodiment than the micro joint. Further, as is understood from Table 1 to Table 9 described above, with the joint portion X with welding in the present embodiment, it is possible to control the retention force by changing not only the length L of the welding protruding-tab 11 but also the width W by several millimeters. Furthermore, it is also possible to control the retention force by changing the escape distance R. It is certainly also possible to control the retention force by combining these parameters. That is to say, the number of control parameters is large, and from this point of view, control of the retention force is easily performed.

FIG. 18(a) and FIG. 18(b) illustrate similar data in the case of SUS. FIG. 19(a) and FIG. 19(b) illustrate similar data in the case of AL. From FIG. 18 and FIG. 19, it is known that the cases of SUS and AL show similar tendencies. Accordingly, in the cases of SUS and AL, it is possible to control the retention force more easily by using the joint portion X with welding of the welding protruding-tab 11 in the present embodiment than the micro joint.

Figure 20:
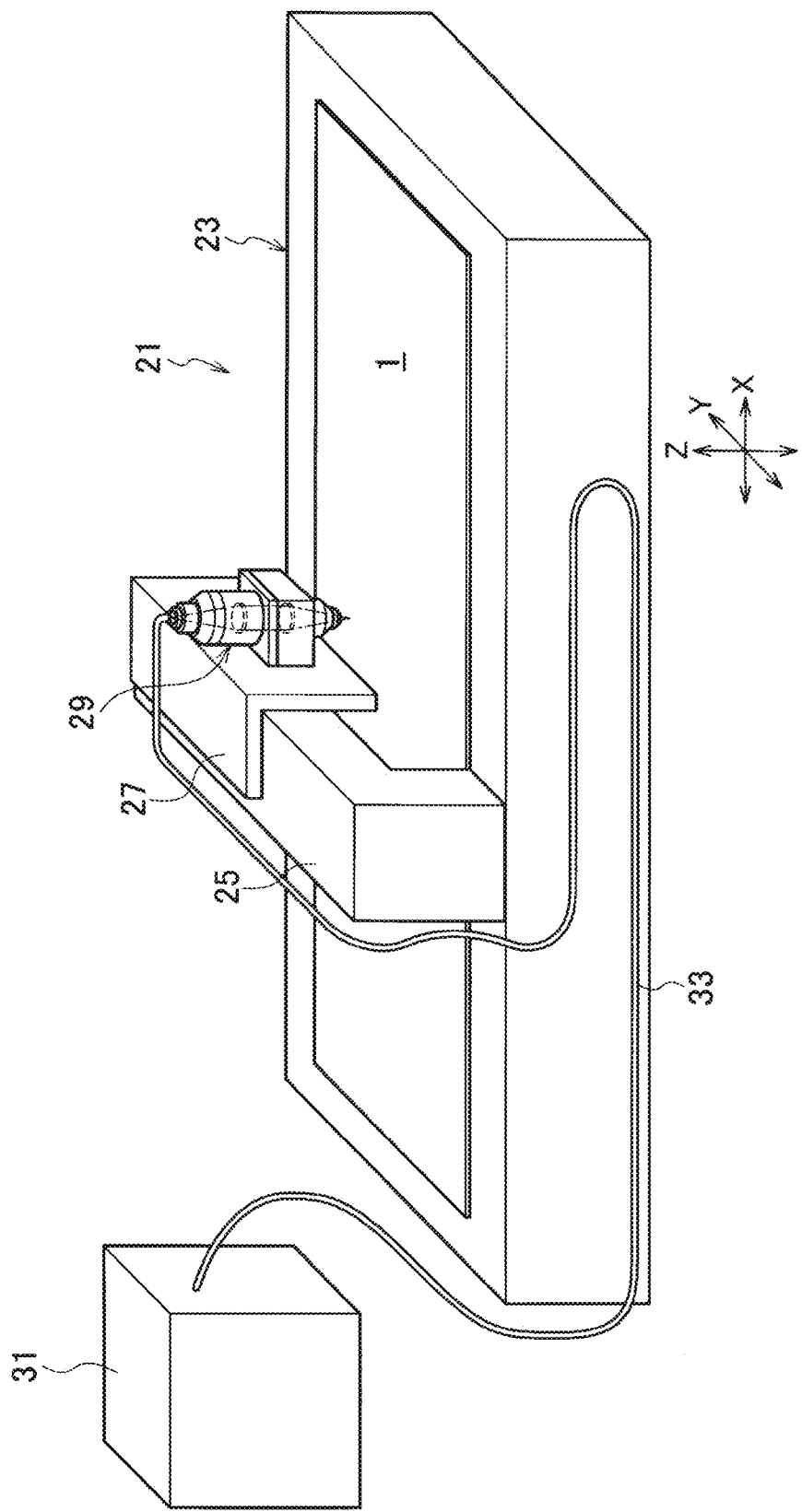
FIG. 20 is a schematic perspective view of a laser processing machine according to the embodiment.

Next, a laser cutting machine 21 according to the embodiment will be described. A configuration of the laser cutting machine 21 will be described hereinafter. The laser cutting machine 21 includes a support frame 23 configured to support the workpiece 1 as illustrated in FIG. 20. In the support frame 23, a gate-type movable frame 25 is provided movably in an X-axis direction. In the movable frame 25, a slider 27 is provided movably in a Y-axis direction. In the slider 27, a laser processing head 29 is included to be movable vertically (in a Z-axis direction).

The laser processing head 29 is provided relatively movably in the X-, Y- and Z-directions with respect to the workpiece 1. Relative positioning in the X-, Y- and Z-directions of the laser processing head 29 is controlled by driving an X-axis servo motor, a Y-axis servo motor and a Z-axis servo motor (not illustrated). In order to laser-cut the workpiece 1 by the laser processing head 29, a fiber laser oscillator 31 as one example of a laser oscillator is provided. The fiber laser oscillator 31 and the laser processing head 29 are connected by an optical fiber 33.

Figure 21:
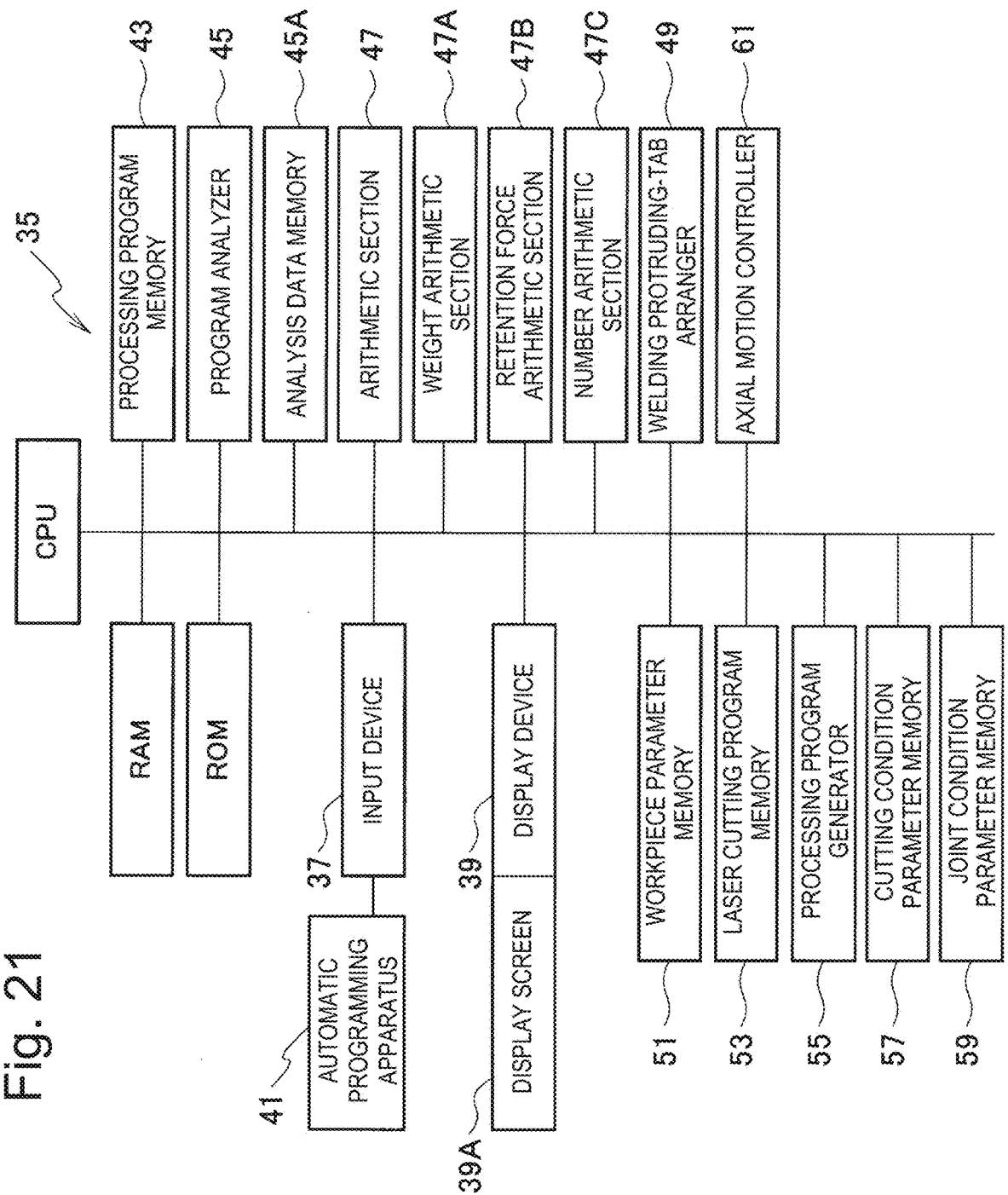
FIG. 21 is a block diagram of a control device of the above described laser processing machine.

The aforementioned laser cutting machine 21 is controlled by a control device 35 (refer to FIG. 21). An operation of the laser processing head 29 and an operation of the laser oscillator 31 are also controlled by the control device 35, and the processed part 3 is laser-cut from the workpiece 1 as described above. The control device 35 is configured by a computer, and includes a CPU, HDD, RAM, ROM, an input device 37, a display device 39 and the like. To the input device 37, an automatic programing device 41 configured to supply (transmit) a processing program to the control device 35 is connected. Note that the processing program (NC data) generated by the automatic programing device 41 can be supplied to the control device 35 by an appropriate storage medium besides wired/wireless communication.

The control device 35 includes a processing program memory 43 configured to store the processing program. Further, the control device 35 also includes a program analyzer 45. The program analyzer 45 reads the processing program stored in the processing program memory 43 ahead and analyzes the processing program, and calculates an arrangement position on the workpiece 1, a shape and dimensions of the processed part 3. Further, the control device 35 also includes an arithmetic section 47 configured to perform various arithmetic calculations. The arithmetic section 47 includes a weight arithmetic section 47A configured to calculate a weight of the processed part 3 by referring to the shape and dimensions of the processed part 3 that are obtained by analyzing the processing program, and a material and thickness of the workpiece 1 and the like, and calculate a gravity-center position and/or a center position of the processed part 3. Further, the arithmetic section 47 also includes a retention force arithmetic section 47B configured to calculate a press force of the welding protruding-tab 11 arranged in a periphery of the processed part 3.

The retention force arithmetic section 47B calculates the retention force=f (the thickness t, the length L, the width W, and other laser cutting conditions) [f(a, b, c, d) shows functions of variables a to d] by referring to the thickness t of the workpiece 1, the length L and the width W of the welding protruding-tab 11, and the other laser cutting conditions. The other laser cutting conditions include laser output power, a processing velocity, a focus position, a pulse output power duty ratio, assist gas pressure, a head nozzle diameter and the like besides the aforementioned escape distance R. Accordingly, it is difficult to uniquely determine the laser cutting condition. Therefore, in order to uniquely determine the laser cutting condition, the control device 35 also includes a cutting condition parameter memory 57.

Various parameters are stored in the cutting condition parameter memory 57. In other words, residual stresses at the time of performing laser-cutting by changing the laser output power, processing velocity, focus position, pulse output duty ratio, assist gas pressure, head nozzle diameter and the like for each of the materials and the thicknesses t of the workpieces 1 are measured in advance, and the various processing conditions are stored in the cutting condition parameter memory 57 as parameters. Accordingly, appropriate parameters can be selected from the cutting condition parameter memory 57 correspondingly to the laser processing conditions.

Further, the control device 35 also includes a joint condition parameter memory 59, and the aforementioned escape distance R is stored in the joint condition parameter memory 59 by being associated with the thickness t. For example, when the material of the workpiece 1 is a mild-steel-based material (SPCC), the escape distance R is selected from a database of (the thickness t, the escape distance R) that satisfies expression (21) described above. Note that at this time, it is possible to set the retention force to be effectively large if expression (22) is satisfied, and therefore expression (22) may be taken into consideration at the time of selection. Alternatively, the joint condition parameter memory 59 may store expression (21) [namely, the graph=map in FIG. 13], and the escape distance R (=function of t) may be determined from expression (21) [and expression (22)] based on the thickness t of the workpiece 1. Likewise, when the workpiece 1 is made of a stainless-steel-based material (SUS), expression (23) and expression (24) described above [namely, the graph=map in FIG. 15] are used, and when the workpiece 1 is made of an aluminum-based material (AL), expression (25) and expression (26) described above [namely, the graph=map in FIG. 16] are used.

Furthermore, the arithmetic section 47 also includes a number arithmetic section 47C configured to calculate the number of welding protruding-tabs 11 to be provided based on an arithmetic calculation result of the weight arithmetic section 47A and an arithmetic calculation result of the retention force arithmetic section 47B. When the arithmetic calculation result includes a part after a decimal point, the number arithmetic section 47C rounds up the arithmetic calculation result to an integer.

Furthermore, the control device 35 also includes a welding protruding-tab arranger 49. The welding protruding-tab arranger 49 arranges the welding protruding-tab 11 in the periphery of the processed part 3 based on analysis data of the arrangement position, shape, dimensions and the like of the processed part 3 that are analyzed by the program analyzer 45 and stored in an analysis data memory 45A, and the arithmetic calculation result of the number arithmetic section 47C.

For example, when the single welding protruding-tab 11 is provided, the welding protruding-tab arranger 49 arranges the welding protruding-tab 11 at a position where a distance from a barycentric position or a center position of the processed part 3 to the outline 9L becomes minimum so that the press force of the welding protruding-tab 11 faces the barycenter or center. When the two or more welding protruding-tabs 11 are provided, the welding protruding-tabs 11 are arranged in the periphery of the processed part 3 equidistantly along a circumferential direction.

After arithmetic calculation of the number of welding protruding-tabs 11 by the number arithmetic section 47C, the processed part 3 may be displayed on a display screen 39A of the display device 39, and the welding protruding-tabs 11 may be arranged in the periphery of the processed part 3 by operating an input device such as a mouse. In this case, it is also possible to increase the number of welding protruding-tabs 11 to a larger number than the number calculated by the number arithmetic section 47C. Further, in this case, the display device 39, the mouse and the like also function as the welding protruding-tab arranger 49.

The shape and the dimensions (the length L and the width W of the rectangle) of the welding protruding-tab 11 are empirically obtained in advance as parameters correspondingly to the material (SPCC, SUS, AL or the like) and the thickness t of the workpiece 1 and the shape and dimensions of the processed part 3. Further, parameters for determining the shape and the dimensions of the welding protruding-tab 11 are stored in a workpiece parameter memory 51. Accordingly, the appropriate shape and dimensions of the welding protruding-tab 11 are selected from the workpiece parameter memory 51 correspondingly to the material and the thickness t of the workpiece 1.

The parameters stored in the workpiece parameter memory 51 are selected from the database of (the thickness t, the length L, the width W) that satisfy both expression (3) and expression (6) described above when the material of the workpiece 1 is a mild-steel-based material (SPCC). Alternatively, expression (3) and expression (6) [namely, the graphs=maps in FIG. 7(a) and FIG. 7(b)] are stored in the workpiece parameter memory 51, and the length L and the width W (=the function of t) may be determined from expression (3) and expression (6) based on the thickness t of the workpiece 1. Likewise, when the workpiece 1 is made of a stainless-steel-based material (SUS), expression (9) and expression (12) described above [namely, the graphs=maps in FIG. 9(a) and FIG. 9(b)] are used, and when the workpiece 1 is made of an aluminum-based material (AL), expression (15) and expression (18) described above [namely, the graphs=maps in FIG. 11(a) and FIG. 11(b)] are used. Note that the parameters selected for processing are stored in the joint condition parameter memory 59 as joint conditions.

When the shape and dimensions of the welding protruding-tab 11 are selected, the processing program (=laser cutting program) for laser-cutting the welding protruding-tab 11 is generated correspondingly to the selected shape and dimensions of the welding protruding-tab 11. In other words, the control device 35 includes a laser cutting program memory 53 in which various laser cutting programs (=processing programs) corresponding to the various shapes and dimensions of the welding protruding-tabs 11 are stored in advance. When the shape and dimensions of the welding protruding-tab 11 are determined by the parameters, a processing program generator 55 selects an appropriate laser cutting program from the laser cutting program memory 53 correspondingly to the determined parameters and stores the laser cutting program in the processing program memory 43.

Further, the control device 35 includes an axial motion controller 61. The axial motion controller 61 controls axial motions in the X-, Y- and Z-directions of the laser processing head 29 in accordance with the processing program stored in the processing program memory 43.

For example, when the processed part 3 is cut from the workpiece 1, analysis of a processing program is performed by the program analyzer 45 when the processing program generated by the automatic programing device 41 is stored in the processing program memory 43. The material and thickness of the workpiece 1, and the shape and dimensions of the processed part 3 are stored in the analysis data memory 45A as the analysis data.

When the processing program is analyzed, the weight arithmetic section 47A calculates the weight of the processed part 3 based on the analysis data (the material and thickness t of the workpiece 1, and the shape and dimensions of the processed part 3). Further, based on the analysis data, an appropriate shape and dimensions of the welding protruding-tab 11 are selected from the workpiece parameter memory 51 (as described above, expression (3) and expression (6) described above, and the like are used). Note that the analysis data may further include data for considering a force with which the processed part 3 is pressed by assist gas pressure at a time of processing when the weight arithmetic section 47A calculates the weight of the processed part 3 in relation to the retention force of the welding protruding-tab 11.

When the appropriate shape and dimensions of the welding protruding-tab 11 are selected from the workpiece parameter memory 51, the appropriate laser cutting conditions for laser-cutting the welding protruding-tab 11 are selected from the cutting condition parameter memory 57 and the joint condition parameter memory 59 (as described above, expression (21) described above and the like are used). Based on the laser cutting conditions and the shape and the dimensions of the welding protruding-tab 11 that are selected, the processing program generator 55 generates the laser cutting program (=processing program) of the welding protruding-tab 11, and stores the laser cutting program in the processing program memory 43. Further, the retention force arithmetic section 47B calculates the retention force of the welding protruding-tab 11 based on the laser cutting conditions and the length L and the width W of the welding protruding-tab 11 that are selected.

Based on the arithmetic calculation result of the weight arithmetic section 47A and the arithmetic calculation result of the retention force arithmetic section 47B, the number arithmetic section 47C calculates a required number of welding protruding-tabs 11 that retain the processed part 3 to prevent falling of the processed part 3 from the workpiece 1. Note that the number of welding protruding-tabs 11 in a standard shape that is required with respect to the weight of an object to be retained may be determined in advance through an experiment, and the required number of welding protruding-tabs 11 may be calculated based on the weight of the object to be retained, without using the retention force arithmetic section 47B.

When the number of welding protruding-tabs 11 is calculated by the number arithmetic section 47C, the welding protruding-tabs 11 are arranged in the periphery of the processed part 3 by the welding protruding-tab arranger 49. Note that the number arithmetic section 47C calculates a minimum required number. Accordingly, it is also possible to arrange the welding protruding-tab 11 additionally by the input device such as a mouse, in the periphery of the processed part 3 displayed on the display screen 39A of the display device 39, for example.

When the arrangement position of the welding protruding-tab 11 is set, the cut slit 7 is laser-cut correspondingly to the arrangement position of the welding protruding-tab 11. After laser-cutting of the cut slit 7, the outline 9L of the processed part 3 is laser-cut in accordance with the processing program stored in the processing program memory 43, and the outline slit 9 is formed. At this time, the free ends of the welding protruding-tabs 11 are welded to the peripheral surface of the processed part 3, and the processed part 3 is retained so as not to fall from the workpiece 1 by the plurality of welding protruding-tabs 11 arranged in the periphery of the processed part 3.

In the above described explanation, the processing program generated by the automatic programing device 41 is stored in the processing program memory 43 of the control device 35, and the program analyzer 45 of the control device 35 analyzes the processing program stored in the processing program memory 43. However, the automatic programing device 41 itself that generates the laser cutting program (=processing program) may analyze the laser cutting program, and the analyzed laser cutting program may be transferred to the control device 35 by a program transferrer 65 (see FIG. 22).

A configuration of the automatic programing device 41 in this case will be described with reference to FIG. 22. Note that same or equivalent components as or to the components of the control device 35 of the laser cutting machine 21 already explained will be assigned with the same reference signs, and redundant explanation of the components will be omitted.

Figure 22:
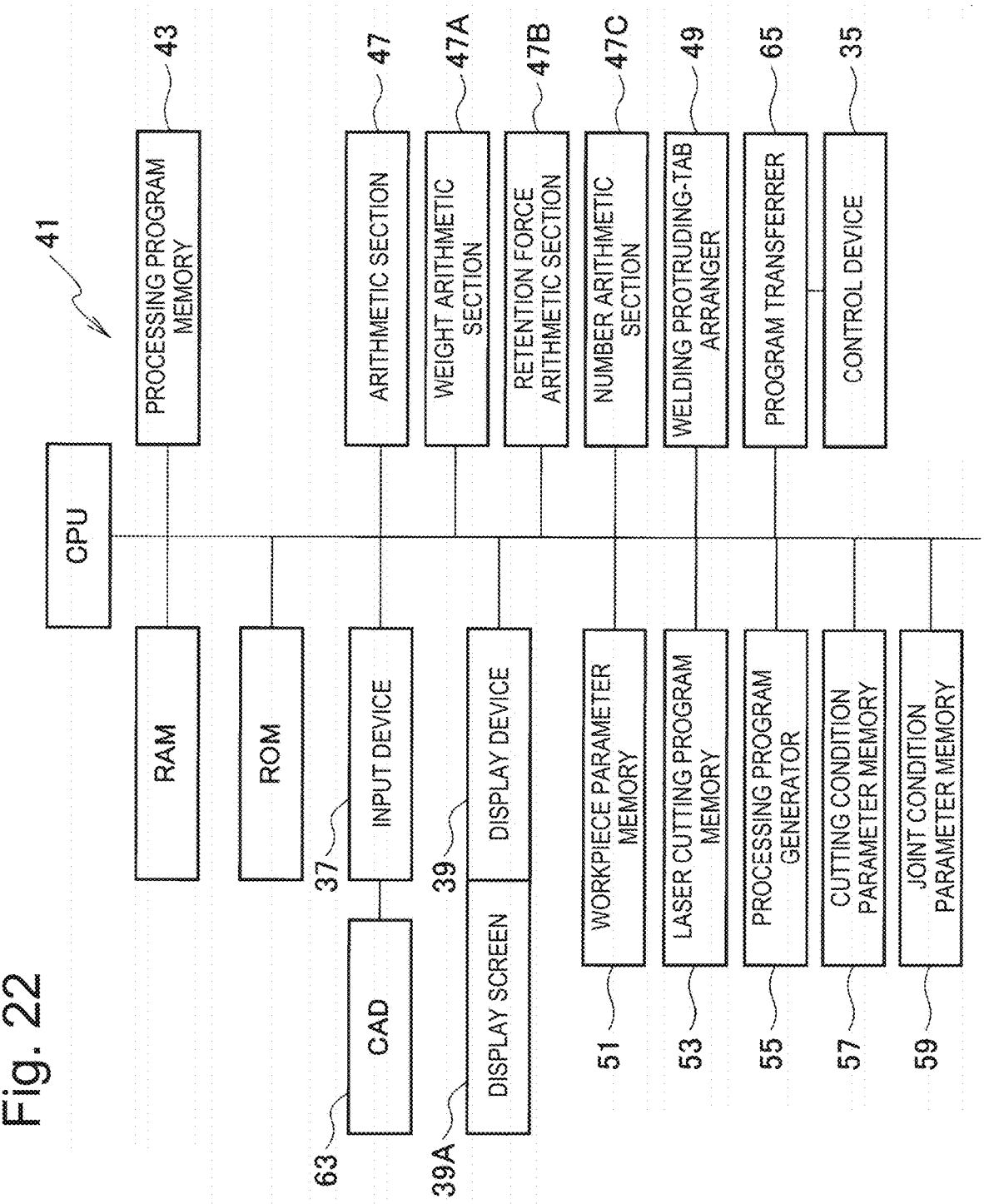
FIG. 22 is a block diagram of an automatic programing apparatus according to the embodiment.

As illustrated in FIG. 22, the automatic programing device 41 includes an arithmetic section 47 similar to the arithmetic section 47 of the control device 35. Accordingly, when an operator inputs a shape and dimensions of a processed part 3 from a CAD 63, the automatic programing device 41 calculates the weight of the processed part 3, and a retention force and a number of welding protruding-tabs 11 that are arranged in a periphery of the processed part 3 (a weight arithmetic section 47A, a retention force arithmetic section 47B and a number arithmetic section 47C). The automatic programing device 41 calculates the number of welding protruding-tabs, 11, and the welding protruding-tab arranger 49 arranges the welding protruding-tabs 11 in the periphery of the processed part 3.

When arrangement positions of the welding protruding-tabs 11 are set in the periphery of the processed part 3, a processing program generator 55 generates a laser cutting program (=processing program) for laser-cutting of the welding protruding-tab 11 and the processed part 3. The processing program generator stores the laser cutting program generated by the processing program generator 55 itself in a processing program memory 43. The program transferrer 65 transfers the laser cutting program stored in the processing program memory 43 to the control device 35.

Note that in the laser cutting machine 21 (refer to FIG. 21) and the automatic programing device 41 (refer to FIG. 22) described above, the aforementioned various memories (processing program memory 43 and the like) are configured by an HDD, ROM, RAM and the like of the aforementioned computer. Further, the aforementioned various arithmetic sections (weight arithmetic section 47A and the like) are configured by a CPU and the like of the aforementioned computer.

In the aforementioned example, the length L and the width W of the welding protruding-tab 11 and the escape distance R are determined (selected) at the time of generation of the processing program (by the control device 35 of the laser cutting machine 21 or the automatic programing device 41). However, these parameters in the program may be corrected (adjusted) by (the control device 35 of) the laser cutting machine 21 based on input by the operator, when laser-cutting is performed. For example, these parameters may be corrected (adjusted) by the operator inputting a desired retention force to the laser cutting machine 21 (control device 35) by using the input device 37. Since it is difficult to know the retention force from the aforementioned parameters (the thickness t, the length L, the width W, the escape distance R), the retention force that is direct and easy to know is input to the control device 35, and the parameters are corrected (adjusted) based on the retention force.

Figure 23:
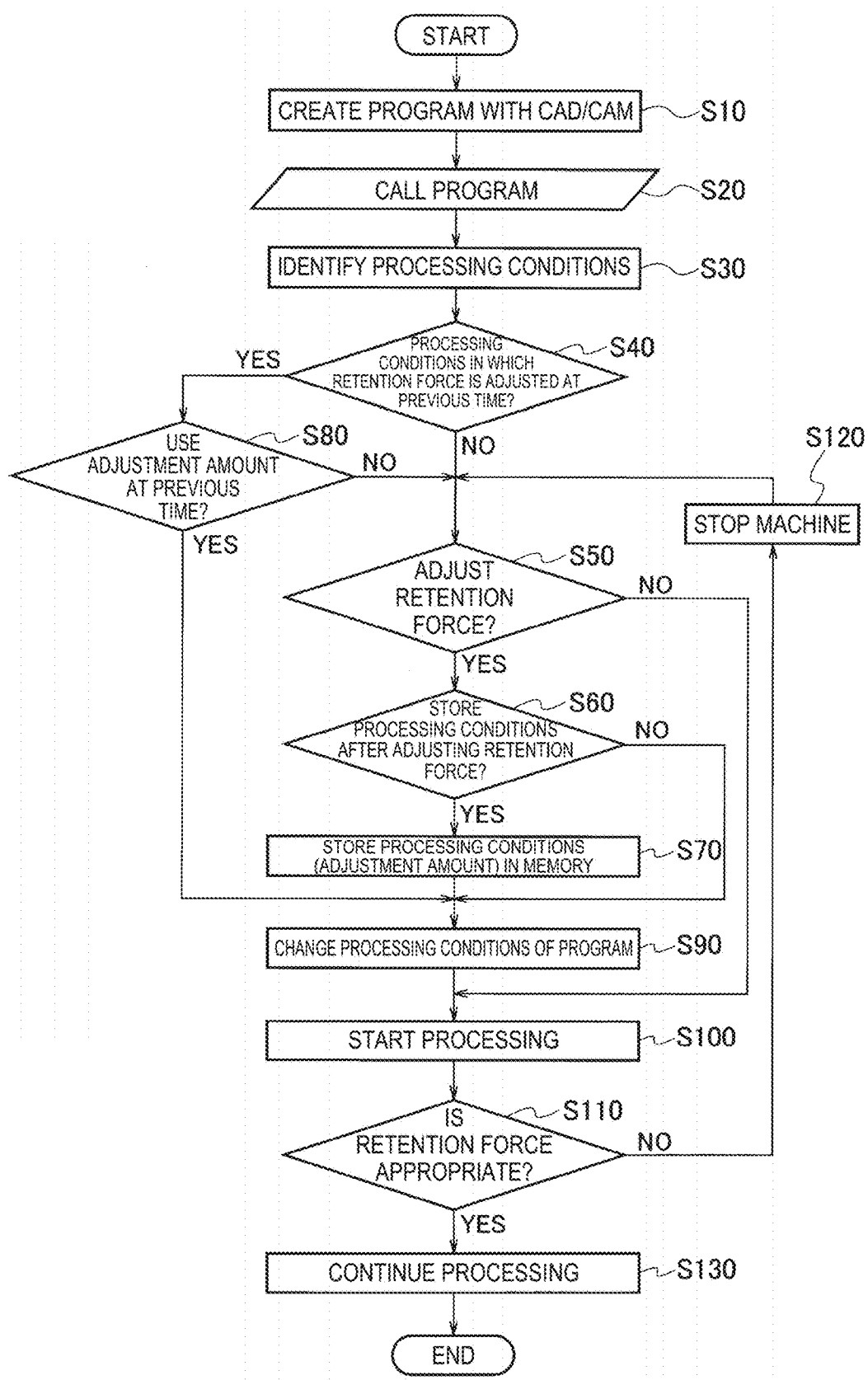
FIG. 23 is a flowchart of laser processing.

A flowchart of one example of the case like this is illustrated in FIG. 23. Hereinafter, explanation will be made with reference to FIG. 23. First, a program is created by CAD/CAM (step S10). This corresponds to generation of a processing program (laser cutting program) by the aforementioned control device 35 or automatic programing device 41. Next, the processing program is read out (step S20). In other words, the processing program is input to the control device 35 of the laser cutting machine 21.

The control device 35 identifies the laser cutting conditions (=laser processing conditions) that are read out (step S30). The processing conditions also include the aforementioned calculated arrangement position of the welding protruding-tab 11. Next, the control device 35 determines whether or not the processing conditions that are read out are the same as the processing conditions (joint conditions) based on the retention force input (adjusted) at the previous processing time (step S40). In other words, step S40 is determined based on input of a desired retention force. Note that at the same time as input of the desired retention force, the aforementioned other laser cutting conditions (the escape distance R, laser output power, processing velocity, focus position, pulse output duty ratio, assist gas pressure, head nozzle diameter and the like) may be also enabled to be input (corrected).

When the retention force that is input this time is equal to the retention force that is adjusted at the previous processing time, step S40 is affirmed. On the other hand, when the retention force that is input this time differs from the retention force that is adjusted at the previous processing time, step S40 is denied. When step S40 is denied, it is determined whether or not to adjust the retention force (step S50). Note that when a desired retention force is not input and the retention force of the program is directly used, both step S40 and step S50 are denied, and the retention force of the program is directly used. When step S40 is affirmed, it is determined whether the retention force that is adjusted at the previous processing time is directly used (step S80). When step S80 is denied, and it is determined that the retention force that is adjusted at the previous processing time is not used, it is also determined whether or not to newly adjust the retention force this time (step S50).

When step S50 is affirmed, the retention force is calculated based on the input desired retention force, the length L, the width W and the escape distance R are corrected, and the adjusted processing conditions are determined. Subsequently, it is determined whether or not to store the processing conditions of this time after the adjustment (step S60). When step S60 is affirmed, the processing conditions (joint conditions) of this time after the adjustment are stored in the memory (step S70). The stored joint conditions are referred to in step S40 at a next processing time. After the processing conditions after the adjustment are stored in the memory, the program is changed under the processing conditions so as to perform laser cutting of this time under the processing conditions (step S90). Note that when step S50 is denied, the processing conditions of the previous time are used, and therefore the program is changed under the processing conditions of the previous time (step S90). When step S60 is denied, the program is changed under the processing conditions of this time without storing the processing conditions of this time in the memory (step S90).

Thereafter, after step S90, laser processing is started (step S100). When passing through step S70, laser processing is started with the retention force adjusted this time. When passing through affirmation of step S80, laser processing is started with the same retention force as the retention force that is adjusted at the previous time. In this case, calculating the retention force (steps S50 to S70) again can be omitted. Further, when passing through denial of step S50, laser processing is started with the retention force of the program.

After step S100, it is determined whether or not the retention force is appropriate during processing (step S110). Specifically, here, whether the processed part 3 deviates from or comes off the workpiece 1 (or whether the scrap 5 illustrated in FIG. 4 deviates from or comes off the processed part 3) is monitored. The monitoring may be performed by visual inspection of the operator, or may be automatically performed by using a camera or the like. In the case by the visual inspection of the operator, step S110 is denied based on an input operation (refer to the input device 37) to the laser cutting machine 21 by the operator.

When step S110 is denied, the laser cutting machine 21 is stopped, the processes from step S50 are performed again, and the retention force is calculated again. Note that step S120 may be automatically stopped, or may be stopped based on a stop operation (refer to the input device 37) of the laser cutting machine 21 by the operator after notification (refer to the display device 39) to the operator. When step S110 is affirmed, the workpiece 1 is laser-cut without a problem, and therefore processing is continued (step S130). When all processes of the program are finished, the processing is finished.

According to the present embodiment, it is possible to retain the processed part 3 (or the scrap 5 of the hole that is formed inside of the processed part 3) by welding to the welding protruding-tab 11. The welding is performed in an extremely small range of the free end of the welding protruding-tab 11, and therefore even after the welded joint portion X is removed, almost no trace is left. Further, the processed part 3 is retained by not only the press force due to the residual stress but also welding, and therefore can be reliably retained. Further, since the residual stress is released after a long time period elapses, the press force due to the residual stress is likely to be weak when the long time period elapses. Since the processed part 3 is retained by welding, the processed part 3 can be retained stably for a long period.

Further, as described above, there is also an advantage that the retention force is more easily controlled as compared with micro joint.

In particular, by setting the aforementioned escape distance R (0<R<slit width SW) when the welding protruding-tab 11 is formed, it is possible to form the joint portion X with welding. Further, by forming the welding protruding-tab 11 in a rectangular shape, it is possible to reliably bend the welding protruding-tab 11 itself, and secure rigidity of the welding protruding-tab 11 itself. As a result, it is possible to realize reliable welding by securing the press force to the joint portion X of the free end by bending.

The welding protruding-tab 11 in a rectangular shape is easily formed, and the escape distance R can also be accurately and easily set, by forming the base-end hole 7Ls in the length slit 7L of the cut slit 7 for forming the welding protruding-tab 11, and laser-cutting the cut slit 7 (the length slit 7L and the width slit 7W) from the base-end hole 7Ls. Here, by making the diameter of the base-end hole 7Ls larger than the slit width SW of the outline slit 9, it is possible to bring the bend fulcrum P of the welding protruding-tab 11 closer to the outline slit 9 (the outline 9L). Accordingly, it is possible to reliably form the joint portion X with welding by promoting bending of the welding protruding-tab 11.

When the thickness t of the workpiece 1 (namely, the welding protruding-tab 11) is too thin, it is difficult to form the joint portion X with welding. Accordingly, when the material of the workpiece 1 is a mild-steel-based material, a stainless-steel-based material or an aluminum-based material, it is possible to form the joint portion X with welding by making the thickness t 1.0 mm or more.

Here, in the case of the mild-steel-based material, it is possible to realize a good retention force by forming the welding protruding-tab 11 in the shape having the dimensions defined by the thickness t, the length L and the width W that satisfy both expression (3) and expression (6) described above, as described by using the tables and graphs. Likewise, in the case of the stainless-steel-based material, it is possible to realize a good retention force by forming the welding protruding-tab 11 in the shape having the dimensions defined by the thickness t, the length L and the width W that satisfy both expression (9) and expression (12) described above. In the case of the aluminum-based material, it is possible to realize a good retention force by forming the welding protruding-tab 11 in the shape having the dimensions defined by the thickness t, the length L and the width W that satisfy both expression (15) and expression (18) described above. By using these expressions, it is possible to easily determine the dimensions (the length L and the width W) of the welding protruding-tab 11 that realizes a good retention force based on the thickness t.

Further here, in the case of the mild-steel-based material, it is possible to realize a better retention force by forming the welding protruding-tab 11 with the escape distance R that satisfies expression (21) described above, as described by using the table and the graph. Likewise, in the case of the stainless-steel-based material, it is possible to realize a better retention force by forming the welding protruding-tab 11 with the escape distance R that satisfies expression (23) described above. In the case of the aluminum-based material, it is possible to realize a better retention force by forming the welding protruding-tab 11 with the escape distance R that satisfies expression (25) described above. It is possible to easily determine the escape distance R that realizes the better retention force based on the thickness t by using these expressions.

The present invention is not limited to the aforementioned embodiment. For example, in the above described embodiment, the parameters selected for processing from the database of (the thickness t, the length L, the width W) that satisfy expression (3), expression (6) and the like are stored in the joint condition parameter memory 59 as the joint conditions. The database (or the graphs=maps in FIG. 7 and the like) of (the thickness t, the length L, the width W) that satisfy expression (3), expression (6) and the like may also be stored in the joint condition parameter memory 59 as the joint conditions. In this case, when the parameters for processing are selected, the database and the maps stored in the joint condition parameter memory 59 are referred to. Further, the joint condition parameter memory 59 may be integrated with the cutting condition parameter memory 57, and the joint conditions may be stored in the cutting condition parameter memory 57.

The entire contents of Japanese Patent Application Laid-Open Publication No. 2018-177354 (filed on Sep. 21, 2018) are incorporated in the present specification by this reference. While the present invention is described as described above by referring to the embodiment of the present invention, the present invention is not limited to the aforementioned embodiment. The scope of the present invention is determined in the light of the claims.

The invention claimed is:

1. A laser cutting method for cutting a processed part from a plate-shaped workpiece, comprising:
    (a) laser-cutting, in advance of forming an outline slit along an outline of the processed part, a cut slit of a welding protruding-tab, the welding protruding-tab being configured to be bent by laser cutting along an outline of the processed part and press a peripheral surface of the processed part that is cut from the workpiece; and
    (b) forming the outline slit by performing laser-cutting along the outline of the processed part, causing the welding protruding-tab to bend and welding a free end of the welding protruding-tab to the peripheral surface of the processed part.

2. The laser cutting method according to claim 1, wherein the welding protruding-tab is formed into a long rectangular shape along the outline of the processed part, the cut slit includes a length slit parallel with the outline and a width slit perpendicular to the length slit, and
an escape distance R that is a length obtained by subtracting an overlap length of the width slit and the outline slit at a time of formation of the outline slit from a slit width of the outline slit is R>0.

3. The laser cutting method according to claim 2, wherein when a hole is formed inside the processed part, a cut slit of a welding protruding-tab configured to be bent by laser-cutting along an outline of the hole and press an inner peripheral surface of the hole is laser-cut in advance in a periphery of a scrap inside of the hole.

4. The laser cutting method according to claim 3, wherein after laser-cutting the scrap inside of the hole, the processed part is laser-cut.

5. The laser cutting method according to claim 2, wherein a base-end hole is formed in a cutting start end of the length slit by laser processing, and the cut slit is laser-cut from the base-end hole.

6. The laser cutting method according to claim 5, wherein a diameter of the base-end hole is made larger than the slit width of the outline slit.

7. The laser cutting method according to claim 1, wherein the workpiece is formed of a mild-steel-based material, and a thickness t (mm) of the workpiece and the welding protruding-tab is equal to or larger than 1.0.

8. The laser cutting method according to claim 2, wherein the workpiece is formed of a mild-steel-based material, and a thickness t (mm) of the workpiece and the welding protruding-tab is equal to or more than 1.0, and when a length along the length slit of the welding protruding-tab is a length L (mm), and a width along the width slit of the welding protruding-tab is a width W (mm), the welding protruding-tab is formed into a shape having dimensions defined by the thickness t, the length L and the width W that simultaneously satisfy following expressions:

$$(0.5294t+12.8825) \le L \le (0.6948t+21.2208)$$

$$(0.0973t+0.8609) \le W \le (0.1833t+1.3168).$$

9. The laser cutting method according to claim 2, wherein the workpiece is formed of a mild-steel-based material, and a thickness t (mm) of the workpiece and the welding protruding-tab is equal to or more than 1.0, and the width slit is formed such that the escape distance R (mm) satisfies a following expression:

$$0 < R \le (0.0261t+0.1654).$$

10. The laser cutting method according to claim 1, wherein
the workpiece is formed of a stainless-steel-based material, and a thickness t (mm) of the workpiece and the welding protruding-tab is equal to or more than 1.0.

11. The laser cutting method according to claim 2, wherein
the workpiece is formed of a stainless-steel-based material, and a thickness t (mm) of the workpiece and the welding protruding-tab is equal to or more than 1.0, and when a length along the length slit of the welding protruding-tab is a length L (mm), and a width along the width slit of the welding protruding-tab is a width W (mm), the welding protruding-tab is formed into a shape having dimensions defined by the thickness t, the length L and the width W that simultaneously satisfy following expressions:

$$(0.8718t+11.2949) \le L \le (1.5769t+16.4231)$$

$$(0.1167t+0.8167) \le W \le (0.1923t+1.3077).$$

12. The laser cutting method according to claim 2, wherein
the workpiece is formed of a stainless-steel-based material, and a thickness t (mm) of the workpiece and the welding protruding-tab is equal to or more than 1.0, and the width slit is formed such that the escape distance R (mm) satisfies a following expression:

$$0 < R \le (0.0249t+0.2068).$$

13. The laser cutting method according to claim 1, wherein
the workpiece is formed of an aluminum-based material, and a thickness t (mm) of the workpiece and the welding protruding-tab is equal to or more than 1.0.

14. The laser cutting method according to claim 2, wherein
the workpiece is formed of an aluminum-based material, and a thickness t (mm) of the workpiece and the welding protruding-tab is equal to or more than 1.0, and when a length along the length slit of the welding protruding-tab is a length L (mm), and a width along the width slit of the welding protruding-tab is a width W (mm), the welding protruding-tab is formed into a shape having dimensions defined by the thickness t, the length L and the width W that simultaneously satisfy following expressions:

$$(1.4615t+7.5385) \leq L \leq (1.7436t+12.5897)$$

$$(0.2910t+0.8256) \leq W \leq (0.3064t+1.2603).$$

15. The laser cutting method according to claim 2, wherein
the workpiece is formed of an aluminum-based material, and a thickness t (mm) of the workpiece and the welding protruding-tab is equal to or more than 1.0, and
the width slit is formed such that the escape distance satisfies a following expression:

$$0 < R \leq (0.0221t+0.2063).$$

16. A laser cutting machine cutting a processed part from a plate-shaped workpiece, comprising:
a laser processing head relatively movable in X-, Y- and Z-directions with respect to the workpiece; and
a control device configured to control an operation of the laser processing head, wherein
the control device comprises:
a processing program memory configured to store a processing program for laser-cutting the processed part;
a program analyzer configured to analyze the processing program and calculate a shape and dimensions of the processed part;
a weight arithmetic section configured to calculate a weight of the processed part based on the shape and dimensions of the processed part that are analyzed, and a thickness of the workpiece;
a number arithmetic section configured to calculate a number of welding protruding-tabs each of which bends and causes a free end of the welding protruding-tab to be welded to a peripheral surface of the processed part when an outline slit is formed by laser cutting along an outline of the processed part, based on an arithmetic calculation result of the weight arithmetic section;
a welding protruding-tab arranger configured to arrange the welding protruding-tab in a periphery of the processed part, based on an arithmetic calculation result of the number arithmetic section;
a processing program generator configured to generate a laser cutting program for forming the welding protruding-tab in a position arranged by the welding protruding-tab arranger;
the processing program memory configured to store the laser cutting program generated by the processing program generator; and
an axial motion controller configured to control axial motion of the laser processing head in accordance with the laser cutting program stored in the processing program memory.

17. The laser cutting machine according to claim 16, wherein
the control device further comprises:
a work parameter memory configured to store parameters of a length L and a width W of the welding protruding-tab formed into a rectangular shape correspondingly to a material and a thickness t of the workpiece; and
a joint condition parameter memory configured to store laser machining conditions of the welding protruding-tab as parameters,
the welding protruding-tab is formed into a long rectangular shape along the outline of the processed part by a cut slit including a length slit parallel with the outline and a width slit perpendicular to the length slit and the outline slit, and
the joint condition parameter memory stores, in association with the thickness t stored in the work parameter memory, an escape distance R that is more than zero and is a length obtained by subtracting an overlap length of the width slit and the outline slit at a time of formation of the outline slit from a slit width of the outline slit.

18. The laser cutting machine according to claim 17, wherein
the work parameter memory stores, as the parameters, the length L (mm) and the width W (mm) of the welding protruding-tab that simultaneously satisfy following expressions, with a mild-steel-based material used as the material of the workpiece, and with a thickness t (mm) of the workpiece and the welding protruding-tab equal to or more than 1.0:

$$(0.5294t+12.8825) \leq L \leq (0.6948t+21.2208)$$

$$(0.0973t+0.8609) \leq W \leq (0.1833t+1.3168).$$

19. The laser cutting machine according to claim 17, wherein
the joint condition parameter memory stores the escape distance R (mm) that satisfies a following expression as one of the parameters of the laser processing conditions, with a mild-steel-based material used as the material of the workpiece, and with a thickness t (mm) of the workpiece and the welding protruding-tab equal to or more than 1.0:

$$0 < R \leq (0.0261t+0.1654).$$

20. The laser cutting machine according to claim 17, wherein
the work parameter memory stores, as the parameters, the length L (mm) and the width W (mm) of the welding protruding-tab that simultaneously satisfy following expressions, with a stainless-steel-based material used as the material of the workpiece, and with a thickness t (mm) of the workpiece and the welding protruding-tab equal to or more than 1.0:

$$(0.8718t+11.2949) \leq L \leq (1.5769t+16.4231)$$

$$(0.1167t+0.8167) \leq W \leq (0.1923t+1.3077).$$

21. The laser cutting machine according to claim 17, wherein
the joint condition parameter memory stores the escape distance R (mm) that satisfies a following expression as one of the parameters of the laser processing conditions, with a stainless-steel-based material used as the material of the workpiece, and with a thickness t (mm) of the workpiece and the welding protruding-tab equal to or more than 1.0:

$$0 < R \leq (0.0249t+0.2068).$$

22. The laser cutting machine according to claim 17, wherein
the work parameter memory stores, as the parameters, the length L (mm) and the width W (mm) of the welding protruding-tab that simultaneously satisfy following expressions, with an aluminum-based material used as the material of the workpiece, and with a thickness t (mm) of the workpiece and the welding protruding-tab equal to or more than 1.0:

$$(1.4615t+7.5385) \leq L \leq (1.7436t+12.5897)$$

$$(0.2910t+0.8256) \leq W \leq (0.3064t+1.2603).$$

23. The laser cutting machine according to claim 17, wherein
the joint condition parameter memory stores the escape distance R (mm) that satisfies a following expression as one of the parameters of the laser processing conditions, with an aluminum-based material used as the material of the workpiece, and with a thickness t (mm) of the workpiece and the welding protruding-tab equal to or more than 1.0:

$$0 < R \leq (0.0221t+0.2063).$$

24. An automatic programing apparatus of a laser cutting machine, comprising:
a weight arithmetic section configured to calculate a weight of a processed part based on a shape and dimensions of the processed part and a thickness t of a workpiece that are input from CAD;
a number arithmetic section configured to calculate a number of welding protruding-tabs each of which bends and causes a free end of the welding protruding-tab to be welded to a peripheral surface of the processed part when an outline slit is formed by laser cutting along an outline of the processed part, based on an arithmetic calculation result of the weight arithmetic section;
a welding protruding-tab arranger configured to arrange the welding protruding-tab in a periphery of the processed part, based on an arithmetic calculation result of the number arithmetic section;
a processing program generator configured to generate a laser cutting program for forming the welding protruding-tab in a position arranged by the welding protruding-tab arranger, and laser-cutting the processed part;
a processing program memory configured to store the laser cutting program generated by the processing program generator; and
a program transferrer configured to transfer the laser cutting program stored in the processing program memory to a control device of the laser cutting machine.

25. The automatic programing apparatus according to claim 24, further comprising:
a work parameter memory configured to store parameters of a length L and a width W of the welding protruding-tab formed into a rectangular shape correspondingly to a material and a thickness t of the workpiece; and
a joint condition parameter memory configured to store laser processing conditions of the welding protruding-tab as parameters, wherein
the welding protruding-tab is formed into a long rectangular shape along the outline of the processed part by a cut slit including a length slit parallel with the outline and a width slit perpendicular to the length slit and the outline slit, and
the joint condition parameter memory stores, in association with the thickness t stored in the work parameter memory, an escape distance R that is more than zero and is a length obtained by subtracting an overlap length of the width slit and the outline slit at a time of formation of the outline slit from a slit width of the outline slit.

26. The automatic programing apparatus according to claim 25, wherein the work parameter memory stores, as the parameters, the length L (mm) and the width W (mm) of the welding protruding-tab that simultaneously satisfy following expressions, with a mild-steel-based material used as the material of the workpiece, and a thickness t (mm) of the workpiece and the welding protruding-tab equal to or more than 1.0:

$$(0.5294t+12.8825) \leq L \leq (0.6948t+21.2208)$$

$$(0.0973t+0.8609) \leq W \leq (0.1833t+1.3168).$$

27. The automatic programing apparatus according to claim 25, wherein
the joint condition parameter memory stores the escape distance R (mm) that satisfies a following expression as one of the parameters of the laser processing conditions, with a mild-steel-based material used as the material of the workpiece, and with a thickness t (mm) of the workpiece and the welding protruding-tab equal to or more than 1.0:

$$0 < R \leq (0.0261t+0.1654).$$

28. The automatic programing apparatus according to claim 25, wherein the work parameter memory stores, as the parameters, the length L (mm) and the width W (mm) of the welding protruding-tab that simultaneously satisfy following expressions, with a stainless-steel-based material as the material of the workpiece, and with a thickness t (mm) of the workpiece and the welding protruding-tab equal to or more than 1.0:

$$(0.8718t+11.2949) \leq L \leq (1.5769t+16.4231)$$

$$(0.1167t+0.8167) \leq W \leq (0.1923t+1.3077).$$

29. The automatic programing apparatus according to claim 25, wherein the joint condition parameter memory stores the escape distance R (mm) that satisfies a following expression as one of the parameters of the laser processing conditions, with a stainless-steel-based material used as the material of the workpiece, and with a thickness t (mm) of the workpiece and the welding protruding-tab equal to or more than 1.0:

$$0 < R \leq (0.0249t+0.2068).$$

30. The automatic programing apparatus according to claim 25, wherein
the work parameter memory stores, as the parameters, the length L (mm) and the width W (mm) of the welding protruding-tab that simultaneously satisfy following expressions, with an aluminum-based material used as the material of the workpiece, and with a thickness t (mm) of the workpiece and the welding protruding-tab equal to or more than 1.0:

$$(1.4615t+7.5385) \leq L \leq (1.7436t+12.5897)$$

$$(0.2910t+0.8256) \leq W \leq (0.3064t+1.2603).$$

31. The automatic programing apparatus according to claim 25, wherein the joint condition parameter memory stores the escape distance R (mm) that satisfies a following expression as one of the parameters of the laser processing conditions, with an aluminum-based material used as the material of the workpiece, and with a thickness t (mm) of the workpiece and the welding protruding-tab equal to or more than 1.0:

$$0 < R \leq (0.0221t + 0.2063).$$

* * * * *